(12) United States Patent
Yamamoto et al.

(10) Patent No.: US 11,983,149 B2
(45) Date of Patent: May 14, 2024

(54) SCENARIO EXECUTION SYSTEM, LOG MANAGEMENT DEVICE, LOG RECORDING METHOD, AND PROGRAM

(71) Applicant: NTT Advanced Technology Corporation, Tokyo (JP)

(72) Inventors: Akinori Yamamoto, Tokyo (JP); Yusuke Tsujikawa, Tokyo (JP); Takashi Hattori, Tokyo (JP); Shuichi Miyazaki, Tokyo (JP)

(73) Assignee: NTT Advanced Technology Corporation, Kawasaki (JP)

( * ) Notice: Subject to any disclaimer, the term of this patent is extended or adjusted under 35 U.S.C. 154(b) by 164 days.

(21) Appl. No.: 17/644,174

(22) Filed: Dec. 14, 2021

(65) Prior Publication Data
US 2022/0197870 A1    Jun. 23, 2022

(30) Foreign Application Priority Data
Dec. 17, 2020 (JP) .................. 2020-209309

(51) Int. Cl.
*G06F 16/00* (2019.01)
*G06F 9/54* (2006.01)
(Continued)

(52) U.S. Cl.
CPC .......... *G06F 16/1805* (2019.01); *G06F 9/542* (2013.01); *G06F 16/27* (2019.01)

(58) Field of Classification Search
None
See application file for complete search history.

(56) References Cited

U.S. PATENT DOCUMENTS 7,958,267 B1 * 6/2011 Eiras .................. G06F 9/541
709/224
11,119,872 B1 * 9/2021 Jacobson ............. G06F 11/202
(Continued)

FOREIGN PATENT DOCUMENTS

JP    2010128901 A    6/2010
JP    4883638 B2    2/2012
(Continued)

OTHER PUBLICATIONS

Japanese Office Action from counterpart JP2020209309, dated Feb. 22, 2022.
(Continued)

*Primary Examiner* — Hasanul Mobin
(74) *Attorney, Agent, or Firm* — Harness, Dickey & Pierce, P.L.C.

(57) ABSTRACT

A scenario execution system includes a scenario execution terminal, a log management device, and a storage device. The scenario execution terminal includes a scenario execution unit and an event notification unit. The scenario execution unit executes a scenario file having a scenario indicating a procedure of operations in the scenario execution terminal described therein. The event notification unit notifies the log management device of information on an event generated by the scenario execution unit executing the scenario file. The log management device includes a log recording unit that receives the information on the event from the scenario execution terminal and records log data having the received information on the event set therein on the storage device. The storage device adds, to the log data, information uniquely generated on the basis of log data recorded before such log data and stores resultant log data.

7 Claims, 15 Drawing Sheets

(51) Int. Cl.
    *G06F 16/18*     (2019.01)
    *G06F 16/27*     (2019.01)

(56)           References Cited

U.S. PATENT DOCUMENTS

2005/0022194 A1*  1/2005  Weir .................... G06F 9/542
                                                      718/100
2006/0117100 A1*  6/2006  Ogawa ................ H04L 67/025
                                                      709/223
2013/0067572 A1*  3/2013  Muramoto ......... H04L 63/1408
                                                      726/22
2015/0143180 A1*  5/2015  Dawson ............... G06F 11/076
                                                      714/38.1
2017/0235859 A1*  8/2017  Delisle .................. G06F 9/542
                                                      703/22
2019/0171752 A1*  6/2019  Ritter ..................... G06F 16/27
2020/0175583 A1*  6/2020  Ye ........................ G06Q 30/018
2022/0197870 A1*  6/2022  Yamamoto .......... G06F 11/3476

FOREIGN PATENT DOCUMENTS

JP           5026451 B2     9/2012
JP        2020003905 A  *  1/2020
JP           6659878 B1    3/2020
JP        2020134819 A     8/2020
JP           6755537 B1    9/2020
JP        2021033316 A  *  3/2021

OTHER PUBLICATIONS

Japanese Notice of Allowance from counterpart JP2020209309, dated Aug. 9, 2022.

* cited by examiner

FIG. 6

LOG DISCLOSURE RANGE INFORMATION

| |
|---|
| SCENARIO ID |
| DISCLOSURE RANGE #1 |
| DISCLOSURE RANGE-SPECIFIC INFORMATION #1 |
| DISCLOSURE RANGE #2 |
| DISCLOSURE RANGE-SPECIFIC INFORMATION #2 |
| : |

FIG. 7

CUSTOMER MANAGEMENT INFORMATION

| | |
|---|---|
| TENANT ID | |
| TENANT NAME | |
| CONTACT INFORMATION | |
| USER INFORMATION | |
| | USER ID |
| | USER NAME |
| | GROUP |
| CLIENT ID | |
| SCENARIO ID | |

FIG. 8

SCENARIO EXECUTION SCHEDULE INFORMATION

| |
|---|
| TENANT ID |
| USER ID |
| CLIENT ID |
| SCENARIO ID |
| EXECUTION START TIMING |
| TASK NAME |
| DISCLOSURE DESTINATION |
| TASK ID |

FIG. 20

| SCENARIO LIST DISPLAY | EXECUTION HISTORY |
| --- | --- |
| SCHEDULE LIST | SEARCH CONDITION [    ] ~F1 |
| EXECUTION HISTORY ~B1 | |

| TASK NAME | STATUS | LOG B2 | LOG GENERATION DATE AND TIME | START DATE AND TIME | END DATE AND TIME |
| --- | --- | --- | --- | --- | --- |
| AAA | COMPLETION | 🏛 | XXXX/XX/XX hh:mm:ss | XXXX/XX/XX hh:mm:ss | XXXX/XX/XX hh:mm:ss |
| BBB | COMPLETION | 🏛 | XXXX/XX/XX hh:mm:ss | XXXX/XX/XX hh:mm:ss | XXXX/XX/XX hh:mm:ss |
| AAA | COMPLETION | 🏛 | XXXX/XX/XX hh:mm:ss | XXXX/XX/XX hh:mm:ss | XXXX/XX/XX hh:mm:ss |

FIG. 21

| SCENARIO LIST DISPLAY | 🏛 LOG |
| --- | --- |
| SCHEDULE LIST | SEARCH CONDITION [    ] |
| EXECUTION HISTORY | |

| TASK ID | START DATE AND TIME | END DATE AND TIME | VERIFICATION | LOG DOWNLOAD |
| --- | --- | --- | --- | --- |
| VVV | XXXX/XX/XX hh:mm:ss | XXXX/XX/XX hh:mm:ss | ✓ | DOWNLOAD ~B3 |
| VVV | XXXX/XX/XX hh:mm:ss | XXXX/XX/XX hh:mm:ss | ✓ | |

Client-ID: xxxxxx
Date:{ datatime: XXXX/XX/XX hh:mm:ss
   log: CLIENT: ACCOUNT A  SCENARIO: SCENARIO #1  EXECUTION RESULT TAKEOVER ID: xxxxxxx
   ENCRYPTION KEY: KEY A  TRANSACTION PRODUCT: ooo  ORDER RECEPTION AMOUNT: ¥ X, XXX-
}

| VVV | XXXX/XX/XX hh:mm:ss | XXXX/XX/XX hh:mm:ss | ✓ | |

Client-ID: xxxxxx
Date:{ datatime: XXXX/XX/XX hh:mm:ss
   log: CLIENT: ACCOUNT A  SCENARIO: SCENARIO #1  EXECUTION RESULT TAKEOVER ID: zzzzzzz
   ENCRYPTION KEY: KEY C  TRANSACTION PRODUCT: ooo  ORDER RECEPTION AMOUNT: XX, XXX-
}

SCENARIO EXECUTION SYSTEM, LOG MANAGEMENT DEVICE, LOG RECORDING METHOD, AND PROGRAM

BACKGROUND OF THE INVENTION

Field of the Invention

The present invention relates to a scenario execution system, a log management device, a log recording method, and a program.

Priority is claimed on Japanese Patent Application No. 2020-209309 filed Dec. 17, 2020, the content of which is incorporated herein by reference.

Description of Related Art

An automation tool such as robotic process automation (RPA) makes it possible to automatically execute routine tasks that have been manually performed using an information processing device such as a personal computer (PC). For example, RPA first creates a scenario in which a task procedure has been described (see, for example, Japanese Patent No. 5026451). Next, in RPA, the PC executes the scenario so that tasks performed manually are reproduced (see, for example, Japanese Patent No. 4883638). With RPA, a time cost or a human cost can be reduced and the number of task mistakes can be reduced.

SUMMARY OF THE INVENTION

There is an advantage that efficiency of tasks manually performed in the related art is improved by the automation tool as described above, and it is thought that the automation tool will become more widespread by further expanding the advantages of introduction of the automation tool. For example, when an automated process being performed by an automation tool can be used as a notarized record, the record can be referred to at the time of auditing or can be used as a record for confirming that information sent to a transaction partner by the automation tool is correct in the transaction partner.

In view of the above circumstances, an object of the present invention is to provide a scenario execution system, a log management device, a log recording method, and a program that can provide information for certifying that an automated process has been performed by an automation tool.

One aspect of the present invention is a scenario execution system including at least one scenario execution terminal, a log management device, and a storage device, wherein the at least one scenario execution terminal includes a scenario execution unit configured to execute a scenario file having a scenario indicating a procedure of operations in the at least one scenario execution terminal described therein; and an event notification unit configured to notify the log management device of information on an event generated by the scenario execution unit executing the scenario file, the log management device includes a log recording unit configured to receive the information on the event from the at least one scenario execution terminal and record log data having the received information on the event set therein on the storage device, and the storage device adds, to the log data, information uniquely generated on the basis of log data recorded before such log data and stores resultant log data.

One aspect of the present invention is the scenario execution system described above, wherein the storage device records the log data through a blockchain.

One aspect of the present invention is the scenario execution system described above, wherein the log management device further includes a scenario providing unit configured to transmit the scenario file to the at least one scenario execution terminal.

One aspect of the present invention is the scenario execution system described above, wherein the at least one scenario execution terminal includes a first scenario execution terminal and a second scenario execution terminal, the log recording unit records first log data on the storage device, the first log data being log data having the information on the event generated by a first scenario file being executed in the first scenario execution terminal, and takeover identification information assigned to the execution of the first scenario file set therein, and the log management device further includes a log management unit configured to receive the takeover identification information from the second scenario execution terminal executing a second scenario file having a procedure including operations for using the information generated by the execution of the first scenario file described therein, and return information regarding the first log data having the received takeover identification information set therein.

One aspect of the present invention is the scenario execution system described above, wherein the information on the event recorded in the first log data includes information generated by the execution of the first scenario file and used in the execution of the second scenario file.

One aspect of the present invention is the scenario execution system described above, wherein the log recording unit records second log data on the storage device, the second log data being log data having the information on the event generated by the second scenario file being executed in the second scenario execution terminal, and takeover identification information assigned to the execution of the second scenario file set therein, and the log management unit receives the takeover identification information from the first scenario execution terminal, and returns information on the second log data having the received takeover identification information set therein.

One aspect of the present invention is the scenario execution system described above, wherein the at least one scenario execution terminal includes first and second scenario execution terminals, and wherein the scenario execution system further includes a scenario providing unit configured to transmit, to the first scenario execution terminal and the second scenario execution terminal, a first scenario file, and a second scenario file having a procedure including operations for using the information generated by execution of the first scenario file described therein, respectively.

One aspect of the present invention is a log management device including: a log recording unit configured to perform processing of: receiving information on an event generated by a scenario execution terminal executing a scenario file having a scenario indicating a procedure of operations in the scenario execution terminal described therein; and recording log data having the received information on the event set therein in a storage device configured to add, to log data, information uniquely generated on the basis of log data recorded before such log data and store resultant log data.

One aspect of the present invention is a log recording method in a scenario execution system including a scenario execution terminal, a log management device, and a storage device, the log recording method including: executing, by the scenario execution terminal, a scenario file having a scenario indicating a procedure of operations in the scenario execution terminal described therein; notifying, by the scenario execution terminal, the log management device of information on an event generated by the scenario file being executed in the step of executing; receiving, by the log management device, information on the event notified of in the step of notifying, and recording log data having the received information on the event set therein on the storage device; and adding, by the storage device, to the log data, information uniquely generated on the basis of log data recorded before such log data and storing resultant log data.

One aspect of the present invention is a log recording method including: receiving information on an event generated by a scenario execution terminal executing a scenario file having a scenario indicating a procedure of operations in the scenario execution terminal described therein; and recording log data having the received information on the event set therein in a storage device configured to add, to log data, information uniquely generated on the basis of log data recorded before such log data and store resultant log data.

One aspect of the present invention is a program for causing a computer to function as the log management device described above.

According to the present invention, it is possible to provide information for certifying that an automated process has been performed by an automation tool.

BRIEF DESCRIPTION OF THE DRAWINGS

FIG. 6 is a table illustrating an example of log disclosure range information according to the first embodiment.

FIG. 7 is a table illustrating an example of customer management information according to the first embodiment.

FIG. 8 is a table illustrating an example of scenario execution schedule information according to the first embodiment.

FIG. 20 is a diagram illustrating a display example of a log search screen according to the first embodiment.

FIG. 21 is a diagram illustrating a display example of the log display screen according to the first embodiment.

DETAILED DESCRIPTION OF THE INVENTION

Hereinafter, an embodiment of the present invention will be described in detail with reference to the drawings. The present embodiment can be applied to a construction of a common base for a third party to notarize a result of an automated process using an automation tool such as RPA. Currently, RPA technology is widespread, but creation of a mechanism thereof has been solved by individual measures. Accordingly, the benefits of the automated process often remain within a limited individual range. The present embodiment makes it possible to provide information that can also be used for auditing for execution of the automated process, and expands advantages of introduction of the automated process.

Figure 1:
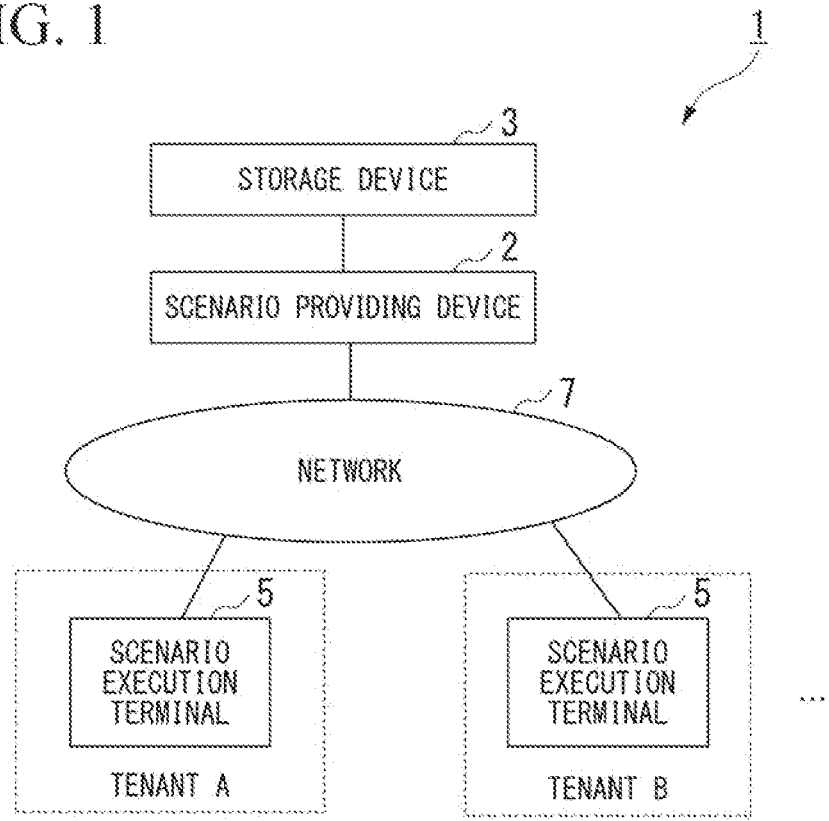
FIG. 1 is a block diagram illustrating a scenario execution system according to an embodiment of the present invention.

FIG. 1 is a configuration diagram of a scenario execution system 1 according to an embodiment of the present invention. The scenario execution system 1 includes a scenario providing device 2 and a storage device 3 of a tenant manager, and a scenario execution terminal 5 of each tenant. The scenario providing device 2 is an example of a log management device. In FIG. 1, a tenant A and a tenant B are shown, but the number of tenants is arbitrary. Further, in FIG. 1, only one scenario execution terminal 5 is shown for each of the tenant A and the tenant B, but the number of scenario execution terminals 5 used by each tenant is arbitrary. The scenario providing device 2 is connected to the scenario execution terminal 5 via a network 7 such as the Internet. Examples of the tenants are companies, schools, and organizations, but the examples are not limited thereto. One or more users of each tenant use the scenario execution terminal 5.

The tenant manager provides an RPA scenario to the tenant using the scenario providing device 2. Further, the scenario providing device 2 generates log data regarding the use or execution of the scenario in the scenario execution terminal 5, and stores the log data in the storage device 3. The storage device 3 records the log data using, for example, a mechanism of a transaction distribution management ledger based on a tamper-resistant blockchain technology. In this case, the storage device 3 includes a plurality of node computers, and the plurality of node computer devices distributively hold log data. The scenario execution terminal 5 is, for example, a computer device such as a PC or a business system. The scenario execution terminal 5 selects a desired scenario from the scenarios provided by the scenario providing device 2, downloads the desired scenario, and executes the downloaded scenario. Further, the scenario execution terminal 5 notifies the scenario providing device 2 of the occurrence of an event regarding use and execution of the scenario or a result of executing the event through an event notification. The event includes, for example, a scenario execution instruction, a scenario execution start, execution of a specific process in the scenario, or scenario execution end. The scenario providing device 2 writes log data based on the received event notification to the storage device 3.

Figure 2:
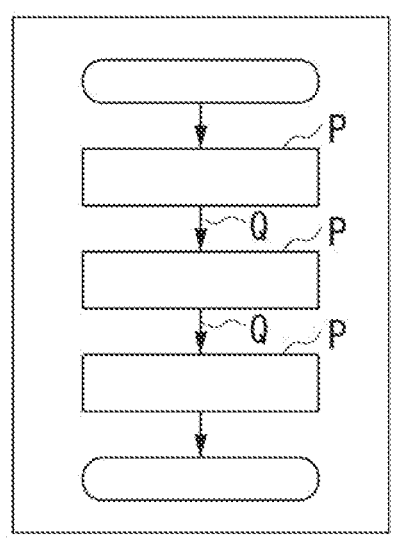
FIG. 2 is a block diagram illustrating an example of a scenario according to the first embodiment.

FIG. 2 is a diagram illustrating an example of a scenario that is executed by the scenario execution terminal 5. The scenario indicates operations that are performed on the scenario execution terminal 5 by a user interface and an order of execution of the operations. A part scenario P indicates an operation that is performed on the scenario execution terminal 5. Further, the part scenario P may indicate a process to be caused to be performed by the scenario execution terminal 5, such as a determination process based on a result of an operation, and transmission of a notification to another device such as the scenario providing device 2. Arrows Q between the part scenarios P indicate an order of execution of these part scenarios P. That is, after the part scenario P at a base of the arrow Q is executed, the part scenario P at a tip of the arrow Q is executed. When the part scenario P is the determination process, next part scenarios P differ depending on a determination result.

Figure 3:
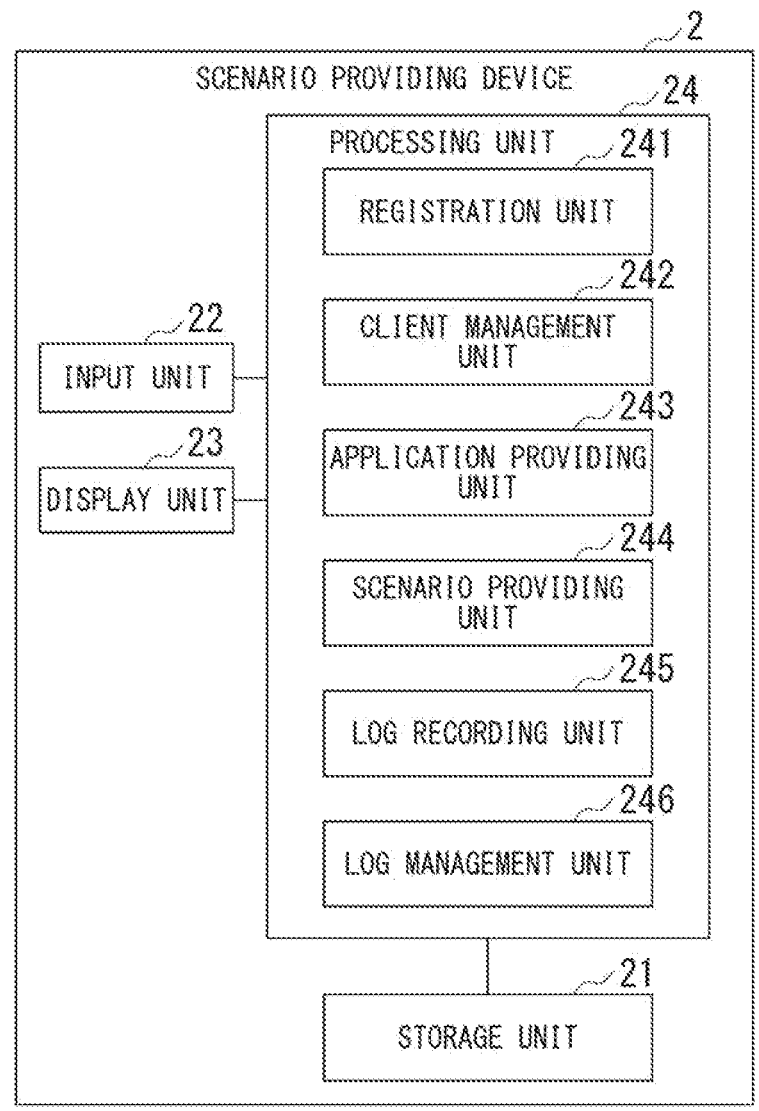
FIG. 3 is a functional block diagram illustrating a scenario providing device according to the first embodiment.

FIG. 3 is a functional block diagram illustrating a configuration of the scenario providing device 2. The scenario providing device 2 is realized by, for example, one or more computer devices (computer servers) on a cloud. When the scenario providing device 2 is mounted by using a plurality of computer devices that are communicatively connected via a network, respective functional units included in the scenario providing device 2 may be distributively mounted on the plurality of computer devices. The computer device by which each functional unit of the scenario providing device 2 is mounted can be arbitrarily determined. Further, the same functional unit may be realized by a plurality of computer devices.

The scenario providing device 2 includes a storage unit 21, an input unit 22, a display unit 23, and a processing unit 24. The storage unit 21 stores various types of information including information that is used for a process of the processing unit 24. The storage unit 21 stores scenario management information, log disclosure range information, customer management information, and scenario execution schedule information. The scenario management information includes a scenario file having a scenario described therein and information on the scenario. The log disclosure range information is information indicating the disclosure range of information in the log data. The customer management information indicates information on a tenant who is a customer who uses the RPA. For example, customer management information includes information on the tenant, scenario information available to the tenant, and the like. The scenario execution schedule information indicates a schedule in which each tenant causes the scenario execution terminal 5 to execute the scenario.

The input unit 22 is configured by using an existing input device such as a keyboard, a pointing device (a mouse, a tablet, or the like), buttons, and a touch panel. The input unit 22 is operated by the tenant manager when various types of information are input to the scenario providing device 2. The input unit 22 may receive information from a computer device of the tenant manager connected to the scenario providing device 2 via the network. The display unit 23 is an image display device such as a cathode ray tube (CRT) display, a liquid crystal display, or an organic electro luminescence (EL) display. The display unit 23 may display information on the computer device of the tenant manager connected to the scenario providing device 2 via the network.

The processing unit 24 includes a registration unit 241, a client management unit 242, an application providing unit 243, a scenario providing unit 244, a log recording unit 245, and a log management unit 246. The registration unit 241 registers, updates and deletes the customer management information, and registers and deletes clients. The client is the scenario execution terminal 5 having a scenario execution application implemented therein. The scenario execution application is an application program that executes a scenario described in the scenario file. The client management unit 242 provides an application program interface (API) for registering clients. The client management unit 242 instructs the registration unit 241 to register and delete the client. The application providing unit 243 transmits the scenario execution application to the scenario execution terminal 5. The scenario providing unit 244 receives the scenario execution schedule information from the scenario execution terminal 5 and writes the scenario execution schedule information to the storage unit 21. The scenario providing unit 244 transmits a scenario execution instruction and a scenario file to the scenario execution terminal 5 according to the scenario execution schedule information.

The log recording unit 245 receives the event notification from the scenario execution terminal 5. The event notification includes information of a type of event, an event execution result, and an event occurrence time. The event execution result depends on the type of event and may not be included depending on the type of event. The log recording unit 245 generates log data on the basis of the event notification. The information in the log data is encrypted according to the disclosure range indicated by the log disclosure range information. The log recording unit 245 writes the generated log data to the storage device 3. The log management unit 246 provides the log data stored in the storage device 3 to the scenario execution terminal 5. Further, the log management unit 246 manages the status of the log data.

Figure 4:
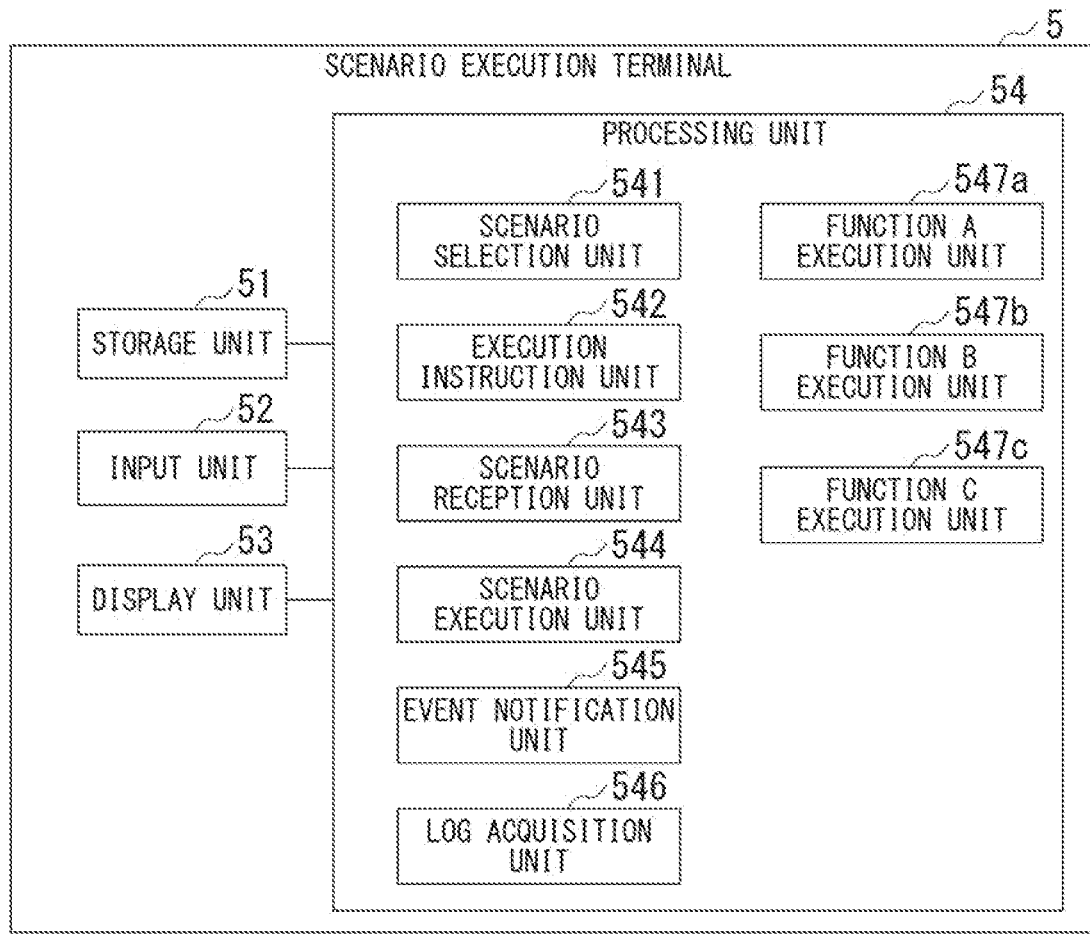
FIG. 4 is a functional block diagram illustrating a scenario execution terminal according to the first embodiment.

FIG. 4 is a functional block diagram illustrating a configuration of the scenario execution terminal 5. The scenario execution terminal 5 includes a storage unit 51, an input unit 52, a display unit 53, and a processing unit 54. The storage unit 51 stores various types of information including information used for a process by the processing unit 54. The storage unit 51 stores a scenario file. The input unit 52 is configured by using an existing input device such as a keyboard, a pointing device (a mouse, a tablet, or the like), buttons, and a touch panel. The input unit 52 is operated by a user when an instruction of the user is input to the scenario execution terminal 5. The display unit 53 is an image display device such as a CRT display, a liquid crystal display, or an organic EL display.

The processing unit 54 includes a scenario selection unit 541, an execution instruction unit 542, a scenario reception unit 543, a scenario execution unit 544, an event notification unit 545, a log acquisition unit 546, and a function X execution unit 547. The scenario selection unit 541 notifies the scenario providing device 2 of information on the scenario selected by the user. The execution instruction unit 542 transmits a scenario execution instruction for the scenario execution terminal 5 to the scenario providing device 2. The transmission of the scenario execution instruction from the execution instruction unit 542 corresponds to registration of the scenario execution schedule information in the scenario providing device 2. The scenario selection unit 541 and the execution instruction unit 542 may be realized by, for example, a web browser that displays web screen data received from the scenario providing device 2. The scenario reception unit 543 receives the scenario file of the scenario instructed to be executed using the scenario execution schedule information from the scenario providing device 2, and writes the scenario file to the storage unit 51. The scenario execution unit 544 reads the scenario file from the storage unit 51 and executes the scenario file.

When an event occurs in the scenario execution terminal 5, the event notification unit 545 transmits an event notification having a type of event that has occurred, the event execution result, and the event occurrence time set therein to the scenario providing device 2. The type of event is, for example, registration of scenario execution schedule information, start of execution of a scenario, execution of a specific part scenario in the scenario, and execution end of the scenario. Information set in the event execution result depends on a type of event. When the client activation corresponds to a scenario execution start event, the client activation is set in the type of event, and whether the client activates normally or the activation fails is set in the event execution result. When the event is execution of a part scenario a, information for specifying the part scenario a is set in the type of event, and a data item and a data value of data obtained as a result of execution of the part scenario a, whether the execution of the part scenario a succeeds or fails, and the like are set in the event execution result. Further, a file to be passed to a tenant of the transaction partner, such as an ordering slip file, a storage location such as a universal resource locator (URL) in which the file is stored, information included in the file, and the like may be included in the event execution result. When the event is the scenario execution end, scenario execution end is set in the type of event, and whether the execution of the scenario ends normally or fails, and the like are set in the event execution result.

The function X execution unit 547 executes an application of a function X. The function X is a function that can be used for execution of a scenario and, for example, can be any function that is implemented on a PC, such as a display of an interface screen of a business processing system of a tenant, mail transmission and reception, table calculation, document editing, postcard creation, figure drawing, or a web browser. Examples of the business processing system include an enterprise resource planning (ERP) system, a customer relationship management (CRM) system, an electronic signature system, and a system that provides a platform for managing and using content on a cloud, but are not limited thereto. In the figure, the function X execution units 547 (X=A, B, and C) that executes respective applications of functions A, B, and C are referred to as a function A execution unit 547*a*, a function B execution unit 547*b*, and a function C execution unit 547*c*. The scenario execution unit 544 executes the scenario, for example, such that an operation with respect to an operation system (OS) of the scenario execution terminal 5 or an operation with respect to a screen of an application displayed on the display unit 53 by the OS or the function X execution unit 547 is performed.

Next, various pieces of data that are used in the scenario execution system 1 will be described.

Figure 5:
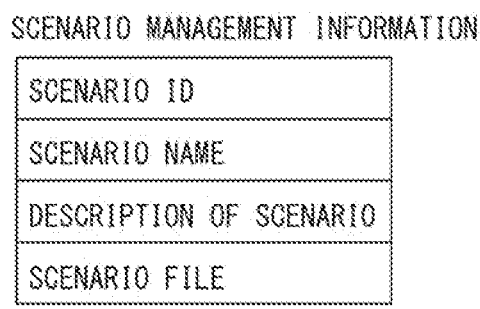
FIG. 5 is a table illustrating an example of scenario management information according to the first embodiment.

FIG. 5 is a diagram illustrating the scenario management information. The scenario management information includes a scenario ID, a scenario name, a description of the scenario, and a scenario file. The scenario ID is information for uniquely specifying a scenario. The scenario file is a file in which a scenario has been described.

FIG. 6 is a diagram illustrating the log disclosure range information. The log disclosure range information indicates the disclosure range of the information included in the log data. The log disclosure range information includes one or more sets of a scenario ID, the disclosure range, and a disclosure range-specific information. The disclosure range indicates a disclosure destination of information in the log data. For example, the disclosure destination can be only the own tenant, a specific user of the own tenant, other tenants, all tenants, the tenant manager, and the like. There may be a plurality of disclosure destinations, such as the own tenant and the tenant manager, or the own tenant and other tenants. The own tenant is a tenant who causes the scenario execution terminal 5 to execute a scenario. The disclosure range-specific information is information in log data that is disclosed to the disclosure destination indicated by the corresponding disclosure range.

For example, it is assumed that that a value of activation OK or NG is set in the event execution result of the event notification of which the event type is client activation. In this case, the disclosure range-specific information of which the disclosure range is the own tenant or a specific user of the own tenant can be the event execution result and the event occurrence time, and there can be no information setting in the disclosure range-specific information of which the disclosure range is other tenants or all tenants. Further, it is assumed that a value of a data item A1 is set in the event execution result of the event notification of which the event type is the execution of the part scenario A. In this case, the disclosure range-specific information of which the disclosure range is the own tenant can be the execution of the part scenario A, the value of the data item A1, and the event occurrence time, and the disclosure range-specific information of which the disclosure range is another tenant that is a transaction partner can be the value of the data item A1 or can be the value of data item A1 and the event occurrence time.

FIG. 7 is a diagram illustrating the customer management information. The customer management information includes a tenant ID, a tenant name, a contact information of the tenant, user information, a client ID, and a scenario ID. A plurality of pieces of the information other than the tenant ID may be set. The tenant ID is information for uniquely specifying the tenant. The user information includes information such as a user ID and a user name of a user using the scenario execution terminal 5, and a group to which the user belongs. The user ID is information for uniquely specifying the user. As the user ID, identification information on the scenario execution terminal 5 may be used. An example of the group is a department to which the user belongs. The client ID is information for specifying the scenario execution terminal 5 that has downloaded the scenario execution application. For example, a management number of the scenario execution application downloaded to the scenario execution terminal 5 can be used as the client ID. As the client ID, a terminal ID such as an address of the scenario execution terminal 5 may be used. The scenario ID set in the customer management information is a scenario selected by the user.

FIG. 8 is a diagram illustrating the scenario execution schedule information. The scenario execution schedule information indicates a schedule for causing the scenario execution terminal 5 to execute a scenario. The scenario execution schedule information includes a tenant ID, a user ID, a client ID, a scenario ID, an execution start timing, a task name, a disclosure destination, and a task ID. The client ID is information for specifying the scenario execution terminal 5 that executes the scenario specified by the scenario ID. The terminal ID of the scenario execution terminal 5 that executes the scenario may be used instead of the client ID. The execution start timing is a timing at which the execution of the scenario file specified by the scenario ID is started. The disclosure destination is a user or another tenant to which at least a part of the log data obtained through execution of the scenario is disclosed. The task ID is identification information assigned by the scenario providing unit 244 of the scenario providing device 2 for execution of the scenario.

Figure 9:
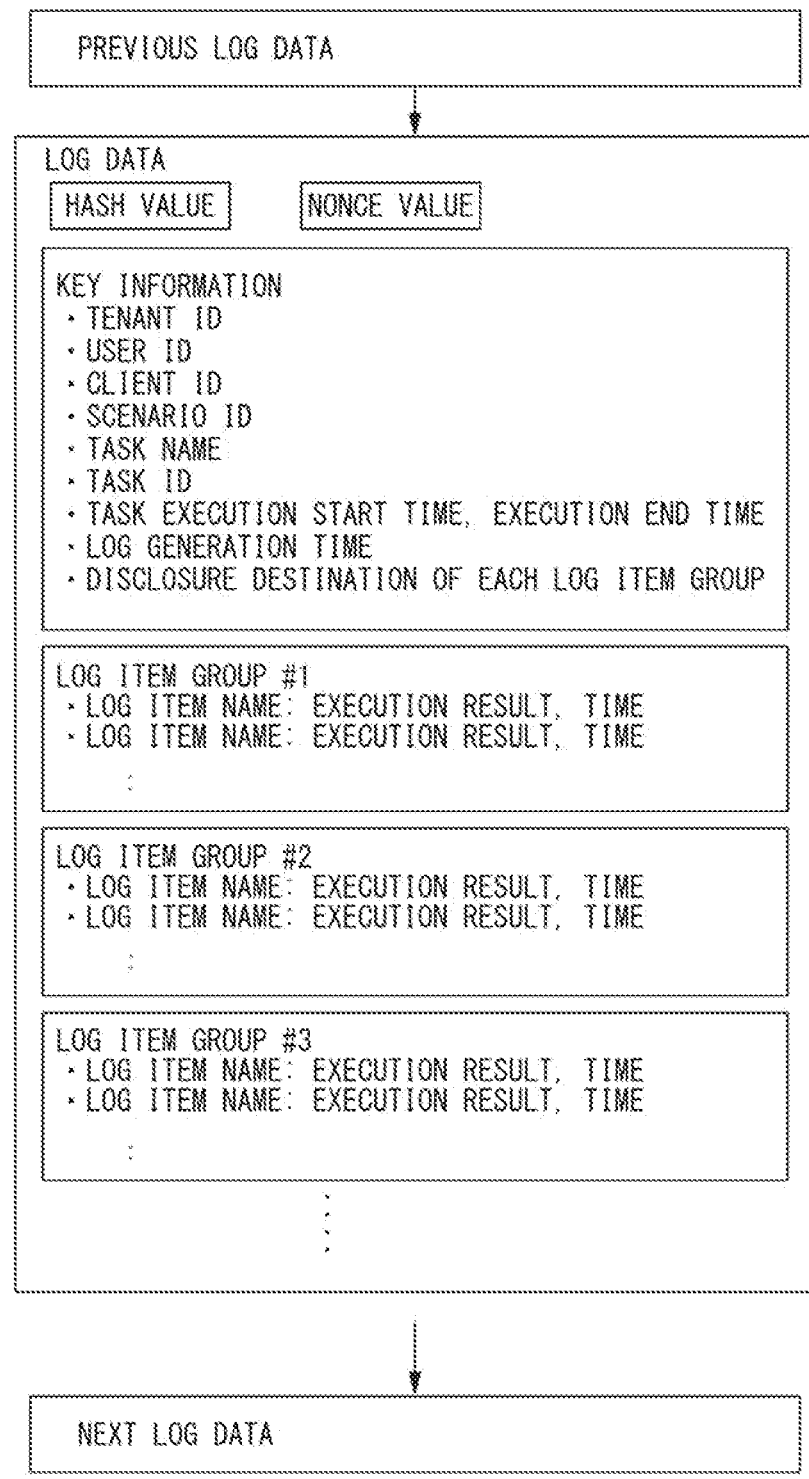
FIG. 9 is a table illustrating an example of log data according to the first embodiment.

FIG. 9 is a diagram illustrating log data. The log data is stored in the storage device 3 through a blockchain. That is, respective node computers constituting the storage device 3 distributively hold log data. The log data includes a hash value, a nonce value, key information, and one or more log item groups. The hash value and the nonce value are information that is used for the blockchain. The hash value is a hash value of previous log data in the blockchain. The nonce value is information that the node computer has used for acquisition of an authority to record log data. The key information is information used for searching for log data. In the present embodiment, the key information includes information on a tenant ID, a user ID, a client ID, a scenario ID, a task name, a task ID, a task execution start time and an execution end time, a log generation time, and a disclosure destination of each log item group. At least a part of the key information may be encrypted so that the part can be used for search by the own tenant, a specific tenant, the tenant manager, or the like.

The respective log item groups have different disclosure ranges. The log item group is encrypted according to the disclosure range. For example, when the disclosure range of a log item group #1 is a tenant A, the log item group #1 is encrypted so that the log item group #1 can be decrypted by a private key X1 of tenant A. Further, when the disclosure range of a log item group #2 is a user group G in the tenant A, the log item group #2 is encrypted so that the log item group #2 can be decrypted with a private key X2 of the group G. Further, when the disclosure range of a log item group #3 is another tenant permitted for the tenant A, the log item group #3 is encrypted so that the log item group #3 can be decrypted with a public key P of the tenant A. Further, when the disclosure range of a log item group #4 is the tenant B of the transaction partner, the log item group #4 is encrypted so that the log item group #4 can be decrypted with a private key Q of the tenant B. Further, when the disclosure range of a log item group #5 is a group company of the tenant A, the log item group #5 is encrypted so that the log item group #5 can be decrypted when all or a predetermined number of decryption keys of the tenant A and tenants A' and A" of the group company are available. When the disclosure range of a log item group #6 is the tenant manager, the log item group #6 is encrypted so that the log item group #6 can be decrypted with a private key of the tenant manager. These are examples, and one log item group may be encrypted so that a plurality of tenants can decrypt the log item group with their own decryption key.

The log item group includes one or more pieces of log item information. The log item information is set on the basis of content notified of from the scenario execution terminal 5 through the event notification. The log item information includes a log item name that is a name of the log item, an execution result, and a time. The log item name may be a type of event set in the event notification or may be an item name determined according to the type of event. Information obtained from the event execution result set in the event notification is set in the execution result. The log item name may be used as the item name of the data item set in the event execution result of the event notification. In this case, the event execution result includes the value of the data item. The time of the log item information is an event execution time set in the event notification.

Next, an operation of the scenario execution system 1 will be described.

Figure 10:
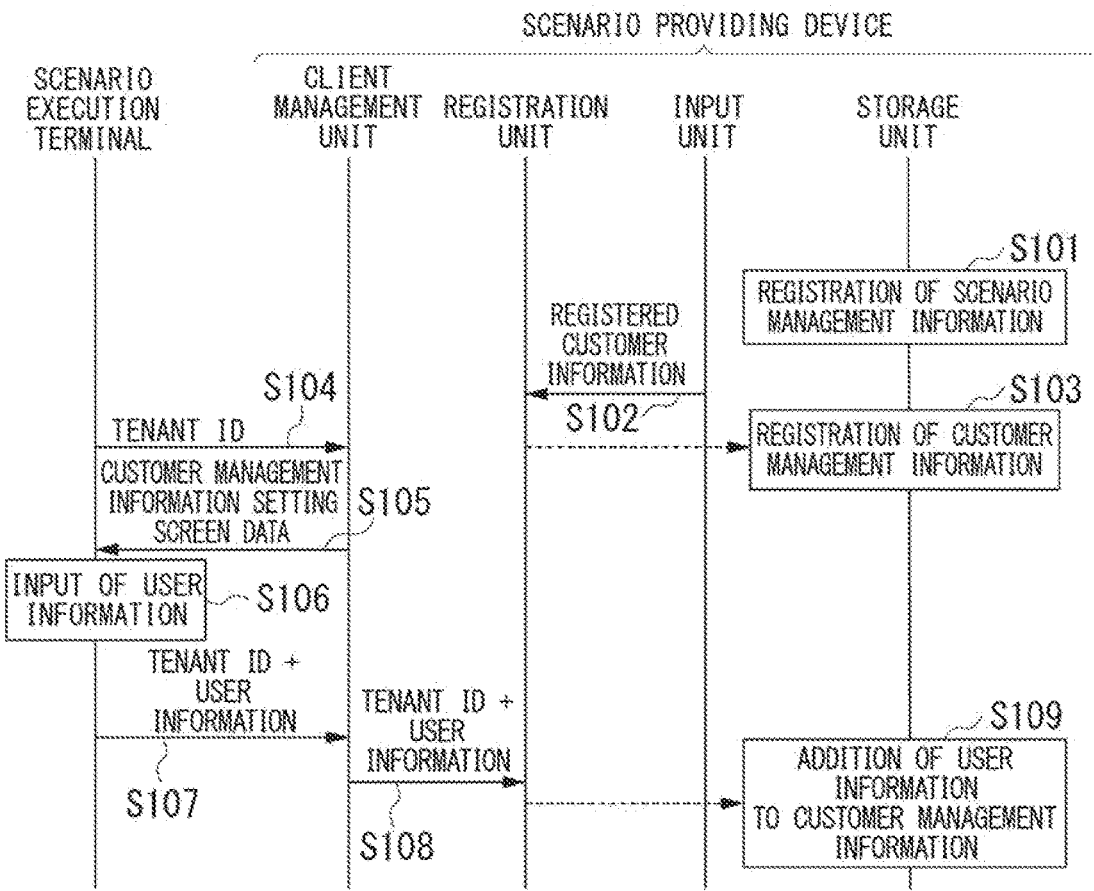
FIG. 10 is a sequence diagram illustrating an initial registration procedure of the scenario execution system according to the first embodiment.

FIG. 10 is a sequence diagram illustrating an initial registration procedure of the scenario execution system 1. The scenario execution system 1 first performs the initial registration procedure for registering information for managing scenarios and tenants. The tenant manager registers the scenario management information and the disclosure range information in the storage unit 21 of the scenario providing device 2 (step S101). Further, the tenant manager inputs registered customer information and a customer management information registration instruction using the input unit 22 (step S102). The registered customer information includes, for example, information such as a tenant name or address of a tenant to be newly registered. When the tenant ID is assigned, the registration unit 241 writes the customer management information having the input registered customer information and the assigned tenant ID set therein to the storage unit 21 (step S103). Further, the registration unit 241 registers the scenario execution application and a client ID not assigned to any client in the storage unit 21 on the basis of the instruction that the tenant manager inputs to the input unit 22.

After the customer management information is registered, the scenario execution terminal 5 transmits the tenant ID to the scenario providing device 2 to access the scenario providing device 2 (step S104). The client management unit 242 of the scenario providing device 2 returns screen data of a customer management information setting screen to the scenario execution terminal 5 (step S105). The user of the tenant inputs user information to the screen data of the management information setting screen displayed by the display unit 53 of the scenario execution terminal 5 using the input unit 52 (step S106). The user information includes information such as a user ID, a user name, and a group to which the user belongs. The scenario execution terminal 5 transmits the tenant ID and the input user information to the scenario providing device 2 (step S107). The client management unit 242 of the scenario providing device 2 outputs the received tenant ID and user information to the registration unit 241 (step S108). The registration unit 241 searches for the customer management information stored in the storage unit 21 using the tenant ID, and adds the user information to the customer management information specified by the search (step S109).

Figure 11:
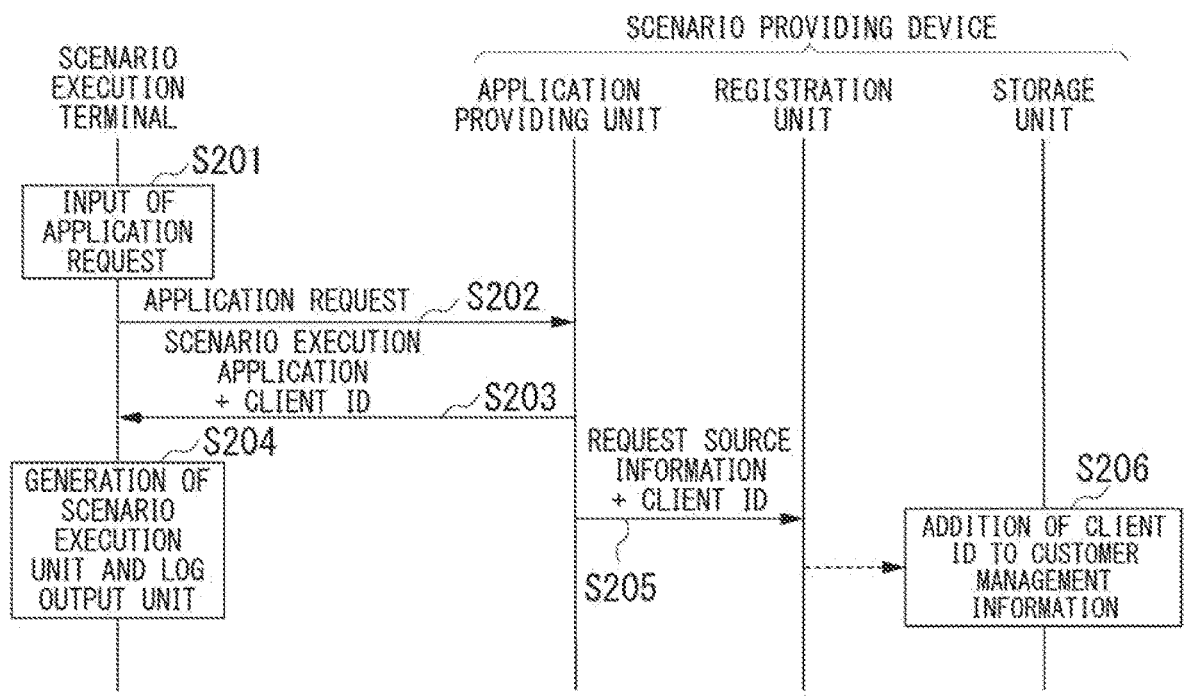
FIG. 11 is a sequence diagram illustrating an application distribution procedure of the scenario execution system according to the first embodiment.

FIG. 11 is a sequence diagram illustrating an application distribution procedure of the scenario execution system 1. Following the initial registration procedure, the scenario execution system 1 performs the application distribution procedure for distributing the scenario execution application to the scenario execution terminal 5. The user of the tenant inputs an application request transmission instruction using the input unit 22 of the scenario providing device 2 (step S201). The processing unit 54 transmits an application request having request source information set therein to the scenario execution terminal 5 (step S202). The request source information includes the tenant ID and may further include the user ID. The application providing unit 243 of the scenario providing device 2 transmits the scenario execution application in which the unassigned client ID is added to the scenario execution terminal 5 to the scenario providing device 2 (step S203). The processing unit 54 of the scenario providing device 2 implements the scenario execution application received from the scenario providing device 2 (step S204). Accordingly, the scenario execution unit 544 and the event notification unit 545 are generated in the scenario execution terminal 5.

On the other hand, the application providing unit 243 of the scenario providing device 2 notifies the registration unit 241 of the request source information and the client ID of the transmitted scenario execution application (step S205). Further, the application providing unit 243 may notify of a distribution time. The registration unit 241 searches for the customer management information stored in the storage unit 21 using the request source information, and adds the client ID and the distribution time to the customer management information specified through the search (step S206).

Figure 12:
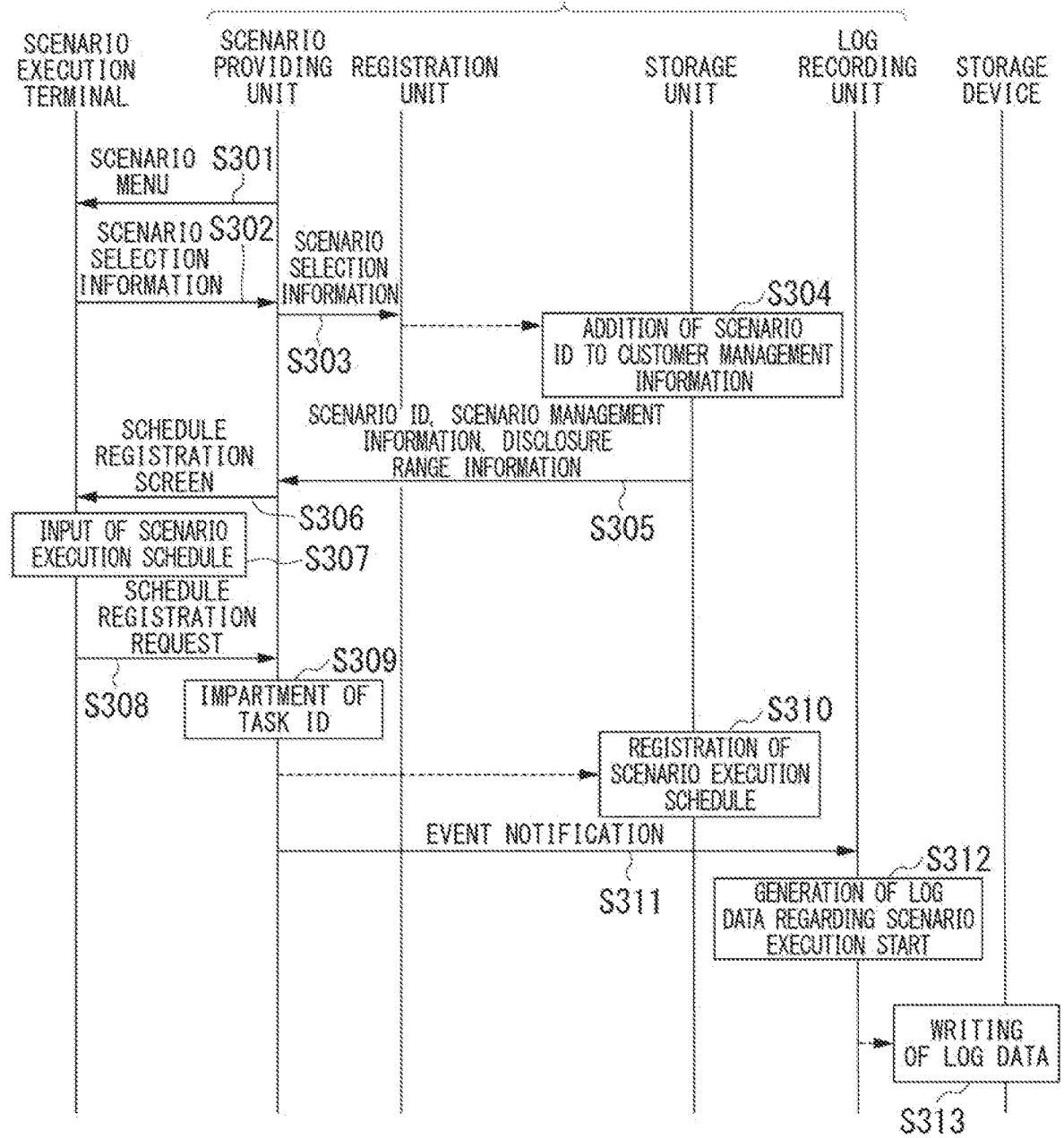
FIG. 12 is a sequence diagram illustrating a scenario execution procedure of the scenario execution system according to the first embodiment.

FIG. 12 is a sequence diagram illustrating a scenario execution instruction procedure of the scenario execution system 1. The scenario providing unit 244 of the scenario providing device 2 reads the scenario ID, the scenario name, and the description of the scenario from the scenario management information stored in the storage unit 21. The scenario providing unit 244 displays a list of these read pieces of information, generates screen data of a menu screen for selecting a scenario to be used from the list, and transmits the screen data to the scenario execution terminal 5 (step S301). The scenario selection unit 541 of the scenario execution terminal 5 displays the received screen data of the menu screen on the display unit 53. The user of the tenant selects a scenario to be used from the displayed menu screen using the input unit 52. The scenario selection unit 541 transmits the scenario selection information having the tenant ID and the scenario ID of the selected scenario set therein to the scenario providing device 2 (step S302). The scenario providing unit 244 of the scenario providing device 2 notifies the registration unit 241 of the received scenario selection information (step S303). The registration unit 241 identifies the customer management information stored in the storage unit 21 using the tenant ID indicated by the received scenario selection information. The registration unit 241 adds the scenario ID set in the scenario selection information to the specified customer management information (step S304).

The scenario providing unit 244 of the scenario providing device 2 reads the scenario ID from the customer management information, and reads the scenario management information and the disclosure range information specified by the read scenario ID (step S305). The scenario providing unit 244 selects an execution target scenario from a list of scenario names corresponding to the scenario IDs on the basis of the read information, and generates screen data of the schedule registration screen for inputting a task name, an execution start timing, and information on the scenario execution terminal 5 for executing the scenario. When a specific user and another tenant are included in the disclosure range information of the scenario, the schedule registration screen includes fields for inputting a user and another tenant that are disclosure destinations. The scenario providing unit 244 transmits the generated screen data of the schedule registration screen to the scenario execution terminal 5 (step S306).

The execution instruction unit 542 of the scenario execution terminal 5 displays the received screen data of the schedule registration screen on the display unit 53. The user inputs the selection of an execution target scenario, the task name, the execution start timing, the information on the scenario execution terminal 5 that executes the scenario, and information on the disclosure destination using the input unit 52 (step S307). The client ID of the scenario execution application implemented in the scenario execution terminal 5 may be used as the information on the scenario execution terminal 5 that executes the scenario. For the execution start timing, immediacy can be set, in addition to a specific date and time. The execution instruction unit 542 transmits a schedule registration request having these input pieces of information, the tenant ID, the user ID, and the client ID set therein to the scenario providing device 2 (step S308). When the scenario providing unit 244 of the scenario providing device 2 receives the schedule registration request, the scenario providing unit 244 assigns a task ID (step S309). The scenario providing unit 244 registers the scenario execution schedule information having the information included in the schedule registration request and the assigned task ID set therein in the storage unit 21 (step S310). The scenario execution terminal 5 may divide and transmit the information set in the scenario execution schedule information in a plurality of times.

Further, the scenario providing unit 244 notifies the log recording unit 245 of the event notification (step S311). Schedule registration is set in the event type. The event execution result includes information such as a tenant ID, a user ID, a client ID, a scenario ID, a task ID assigned by the scenario providing unit 244, and success or failure of the schedule registration received according to the schedule registration request. The log recording unit 245 generates log data using the information included in the event notification (step S312) and writes the log data to the storage device 3 (step S313). For example, a tenant ID, a user ID, a client ID, a scenario ID, and a task ID are set in the key information of the log data. Further, a log item in which a log item name "schedule registration" corresponding to the type of event, the event execution result indicating success or failure of the schedule registration, and the event occurrence time are associated with each other is set in a log item group of which the disclosure range is the tenant A and a log item group of which the disclosure range is the tenant manager.

Figure 13:
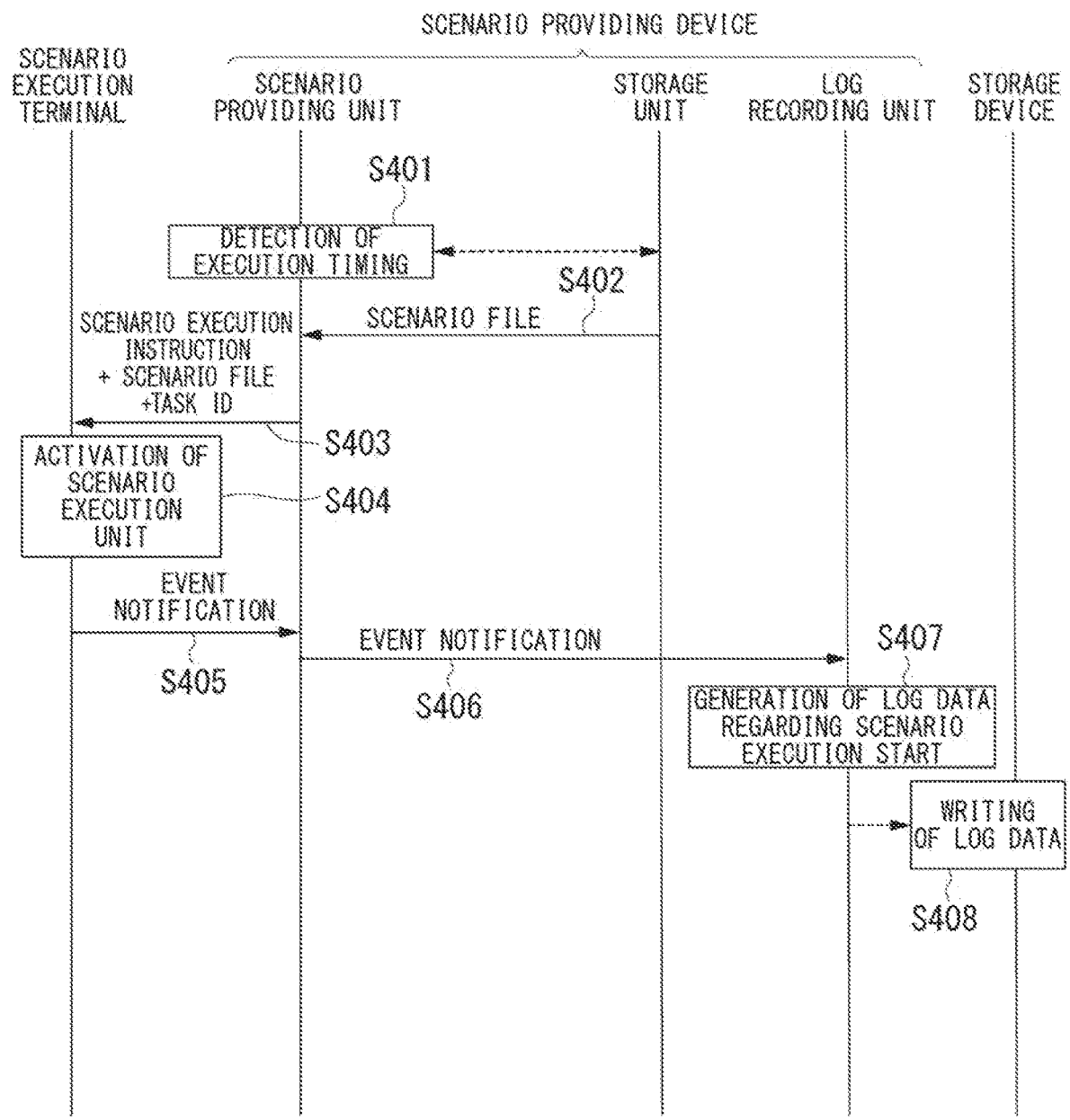
FIG. 13 is a sequence diagram illustrating a scenario activation procedure of the scenario execution system according to the first embodiment.

FIG. 13 is a sequence diagram illustrating a scenario activation procedure of the scenario execution system 1. The scenario providing unit 244 of the scenario providing device 2 refers to the execution timing of the scenario execution schedule information stored in the storage unit 21 to detect an execution timing (step S401). The scenario providing unit 244 reads the scenario file having the scenario ID set in the detected scenario execution schedule information from the storage unit 21 (step S402). The scenario providing unit 244 transmits the scenario execution instruction, the scenario file, and the task ID read from the detected scenario execution schedule information to the scenario execution terminal 5 that is an execution target set in the scenario execution schedule information (step S403). The scenario reception unit 543 of the scenario execution terminal 5 stores the received scenario file and task ID in the storage unit 51. The scenario execution unit 544 receives the scenario execution instruction and is activated (step S404).

The event notification unit 545 of the scenario execution terminal 5 transmits an event notification indicating that the client has been activated to the scenario providing device 2 (step S405). The event notification includes information such as the tenant ID, the user ID, the client ID, the scenario ID, the task ID, the type of event, the event execution result, and the event occurrence time. The scenario ID is read from the received scenario file. The event execution result indicates whether the activation of the scenario execution unit 544 succeeds or fails. The type of event indicates the activation of the client. The event occurrence time indicates a time when the scenario execution unit 544 has been activated. The scenario providing unit 244 of the scenario providing device 2 receives the event notification and notifies the log recording unit 245 of the event notification (step S406). Alternatively, the log recording unit 245 may directly receive the event notification from the scenario execution terminal 5 without passing through the scenario providing unit 244. The log recording unit 245 generates log data using the information included in the event notification (step S407) and writes the log data to the storage device 3 (step S408). For example, the tenant ID, the user ID, the client ID, the scenario ID, and the task ID are set in the key information of the log data. Further, a log item in which a log item name "client activation" corresponding to the type of event, the event execution result, and the event occurrence time are associated with each other is set in the log item group of which the disclosure range is the tenant A.

Figure 14:
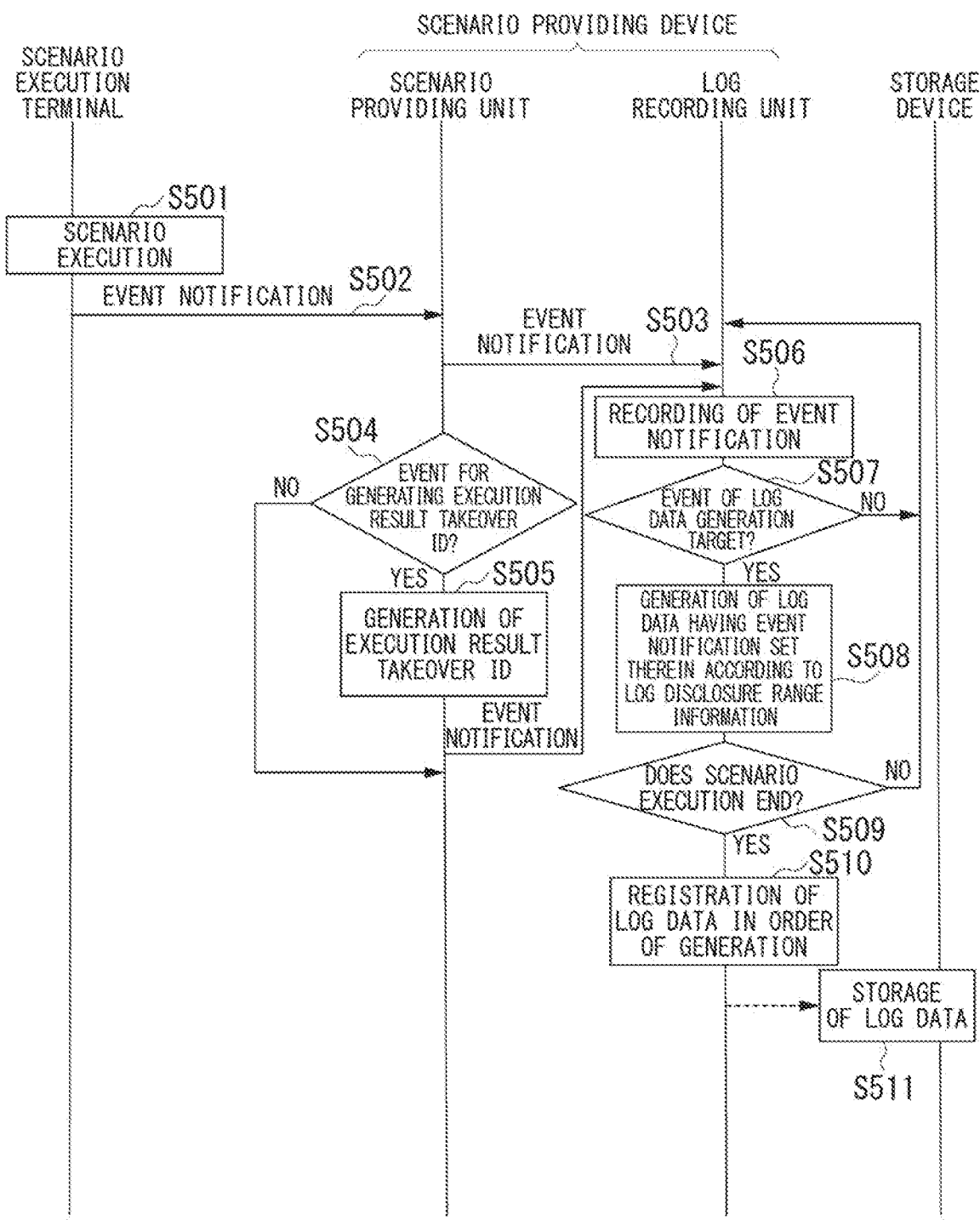
FIG. 14 is a sequence diagram illustrating a scenario execution log recording procedure of the scenario execution system according to the first embodiment.

FIG. 14 is a sequence diagram illustrating a scenario execution log recording procedure of the scenario execution system 1. The scenario execution unit 544 of the scenario execution terminal 5 executes the scenario described in the scenario file stored in the storage unit 51 (step S501). When the event notification unit 545 detects that a predetermined part scenario in the scenario has been executed, the event notification unit 545 transmits an event notification indicating that the part scenario has been executed to the scenario providing device 2 (step S502). Information on the part scenario in which the event notification is performed and an execution result of a notification target are added to the scenario file in advance. Further, a part scenario in which an event notification is performed may be included in the scenario. In this case, information of the notification target as the event execution result is set in the part scenario. The event notification includes information such as the tenant ID, the user ID, the client ID, the scenario ID, the task ID, the type of event indicating the executed part scenario, the event execution result indicating the result of execution of the part scenario, and the event occurrence time indicating an execution time of the part scenario.

The scenario providing unit 244 of the scenario providing device 2 outputs the received event notification to the log recording unit 245 (step S503). Further, the scenario providing unit 244 refers to an event type included in the event notification to determine whether or not an event is an execution result takeover ID generation target (step S504). For example, the scenario execution end or execution of a specific part scenario can be the execution result takeover ID generation target. This specific part scenario is placed within the scenario so that the part scenario is executed, for example, when one transaction is completed. Further, this specific part scenario may be a part scenario for transmitting an execution result takeover ID generation request. When the execution result takeover ID is generated by the scenario execution terminal 5, the log recording unit 245 may receive the event notification directly from the scenario execution terminal 5 without passing through the scenario providing unit 244.

When the scenario providing unit 244 determines that the event type is not a countermeasure for generating an execution takeover ID (step S504: NO), the scenario providing unit 244 waits for the next event notification. When the scenario providing unit 244 determines that the event type is the countermeasure for generating the execution takeover ID (step S504: YES), the scenario providing unit 244 generates the execution result takeover ID (step S505). The scenario providing unit 244 generates an event having information such as the tenant ID, the user ID, the client ID, the scenario ID, the task ID, the type of event indicating the generation of the execution result takeover ID read from the received event notification, the event execution result indicating the generated execution result takeover ID, and the event occurrence time set therein, and outputs the event to the log recording unit 245.

The log recording unit 245 stores the event notification received in step S503 or step S506 in the storage unit 21 (step S506). The log recording unit 245 determines whether or not the event type of received event notification is a log data generation target event (step S507). For example, an event indicating that a part scenario for execution end of one scenario or log generation within the scenario or a part scenario in which log generation has been determined in advance has been executed can be a log data generation target event. For example, placement of the part scenario for log generation at a point at which generation of one order processing slip is completed makes it possible to generate log data in units of slip (transaction).

When the log recording unit 245 determines that the event type is not the log data generation target event (step S507: NO), the log recording unit 245 returns to the process from step S506. On the other hand, when the log recording unit 245 determines that the event type is the log data generation target event (step S507: YES), the log recording unit 245 generates the log data using the stored event notification (step S508). The log recording unit 245 reads the key information from each event notification. Further, the log recording unit 245 reads the disclosure range-specific information of each disclosure range indicated by the log disclosure range information. The log recording unit 245 generates log item information of each disclosure range indicated by each piece of disclosure range-specific information on the basis of each stored event notification. The log recording unit 245 generates a log item group including log item information of the disclosure range for each disclosure range. The log recording unit 245 encrypts the log item group of each disclosure range according to the disclosure range. When the disclosure destination of the disclosure range is a specific user or another tenant, the log recording unit 245 reads information on the disclosure destination from the scenario execution schedule information, and encrypts the disclosure range according to the read disclosure destination. Further, the log recording unit 245 may encrypt all or a part of the key information according to the disclosure destination of the key information. The log recording unit 245 generates log data having the key information and each encrypted log item group set therein.

The log recording unit 245 determines whether or not the event type set in the event notification indicates scenario execution end (step S509). When the log recording unit 245 determines that the event type does not indicate the scenario execution end (step S509: NO), the log recording unit 245 returns to the process from step S506. The scenario execution system 1 repeats the process from step S502.

On the other hand, when the log recording unit 245 determines that the event type indicates the scenario execution end (step S509: YES), the log recording unit 245 registers the log data in the storage device 3 in order of generation (step S510). The storage device 3 stores the log data in an order of generation through the blockchain (step S511). The storage device 3 adds a hash value, a nonce value, and information for specifying the previous and next log data to the log data to be stored. The storage device 3 may use log data before log data to be newly stored as, for example, log data having a latest generation time, and may use the log data before log data to be newly stored as log data having a latest generation time among the log data selected on the basis of some information such as the tenant ID included in the key information.

The log recording unit 245 may register the log data in the storage device 3 each time the log data is generated. Further, the event notification unit 545 of the scenario execution terminal 5 may notify the scenario providing device 2 of the event notification in a predetermined period without notifying each time. Further, although the information on the disclosure destination is transmitted from the scenario execution terminal 5 to the scenario providing device 2 when the scenario execution schedule information is registered as described above, the user may input the information on the disclosure destination using the input unit 52 before or while the scenario execution terminal 5 executes the scenario or an operation for acquiring the information on the disclosure destination may be included in the scenario. The scenario execution terminal 5 notifies the scenario providing device 2 of the acquired information on the disclosure destination.

Figure 15:
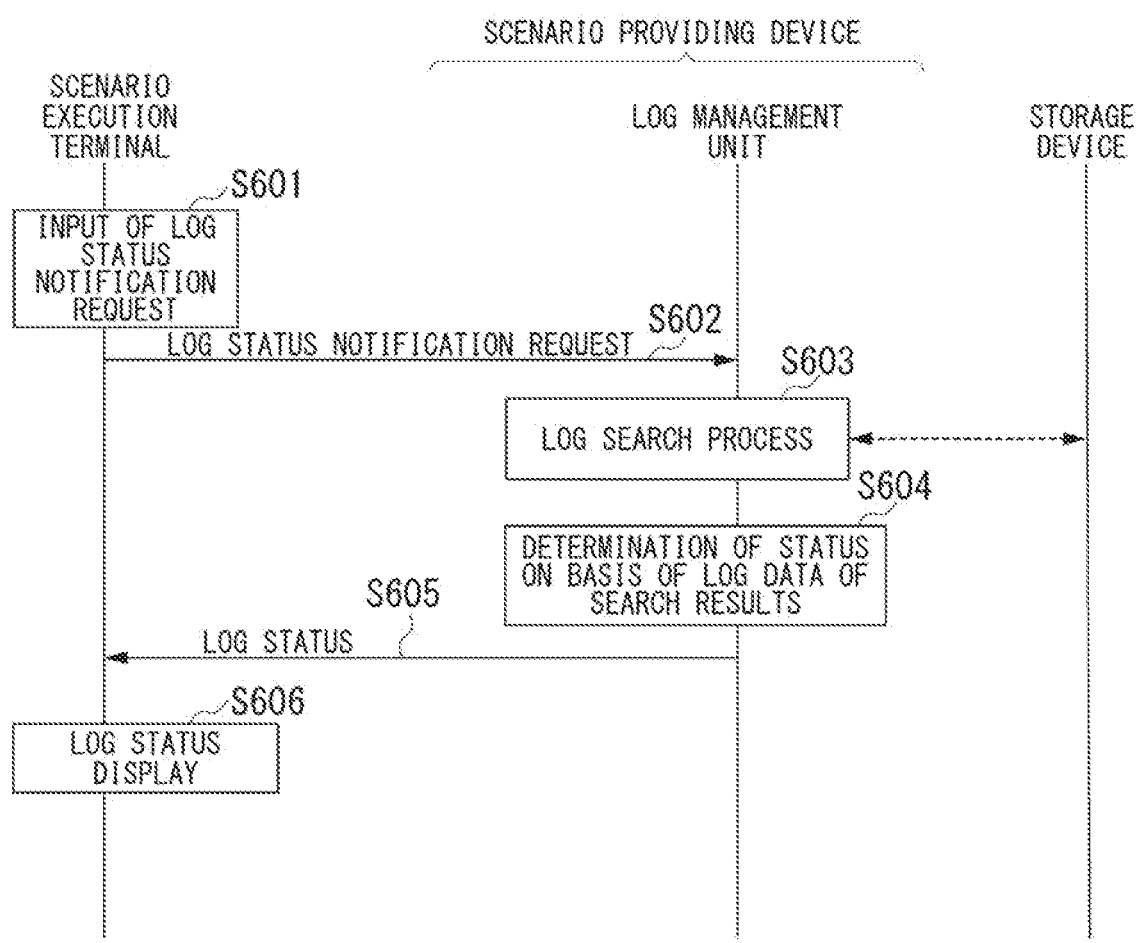
FIG. 15 is a sequence diagram illustrating a log status inquiry procedure of the scenario execution system according to the first embodiment.

FIG. 15 is a sequence diagram illustrating a log status inquiry procedure of the scenario execution system 1. The tenant inputs a log data search condition and a log status notification request using the input unit 52 of the scenario execution terminal 5 (step S601). For the search condition, information included in the key information such as a tenant ID, a client ID, a user ID, a scenario ID, and a task ID, and log item information of which the disclosure destination is the own tenant can be used. The log acquisition unit 546 transmits a log status notification request having the search conditions, a searcher information, and the decryption key of the searcher indicated by the searcher information set therein to the scenario providing device 2 (step S602). The searcher information may be the tenant ID or may be a combination of the tenant ID with the user ID. Further, a storage location of the decryption key may be set in the log status notification request instead of the decryption key.

When the log management unit 246 of the scenario providing device 2 receives the log status notification request, the log management unit 246 performs a search process on the log data stored in the storage device 3 according to the search conditions set in the log status notification request (step S603). The log management unit 246 specifies log data that is permitted to be viewed by the tenant or the user indicated by the searcher information. The log management unit 246 decrypts the specified log data using the decryption key notified of through the log status notification request. The log management unit 246 searches for the decrypted log data according to the search conditions.

The log management unit 246 determines the status on the basis of the log data detected through the search in step S603 (step S604). The log management unit 246 determines that the log has not been generated when the log data cannot be obtained or when there is no log data corresponding to a scenario start event. The log management unit 246 determines that the log is being generated when the log data corresponding to a scenario end event has not been generated after the log data corresponding to the scenario start event has been generated. Further, the log management unit 246 determines that the log has been generated when there is log data of an event corresponding to the scenario end. When log data is obtained for a plurality of task IDs, the log management unit 246 determines the above status for each task ID.

The log management unit 246 notifies the scenario execution terminal 5 of the search conditions and the determined log status (step S605). For example, the log management unit 246 transmits a log status display screen for displaying the log status to the scenario execution terminal 5. The log acquisition unit 546 of the scenario execution terminal 5 displays the log status display screen received from the scenario providing device 2 on the display unit 53 (step S606).

Figure 16:
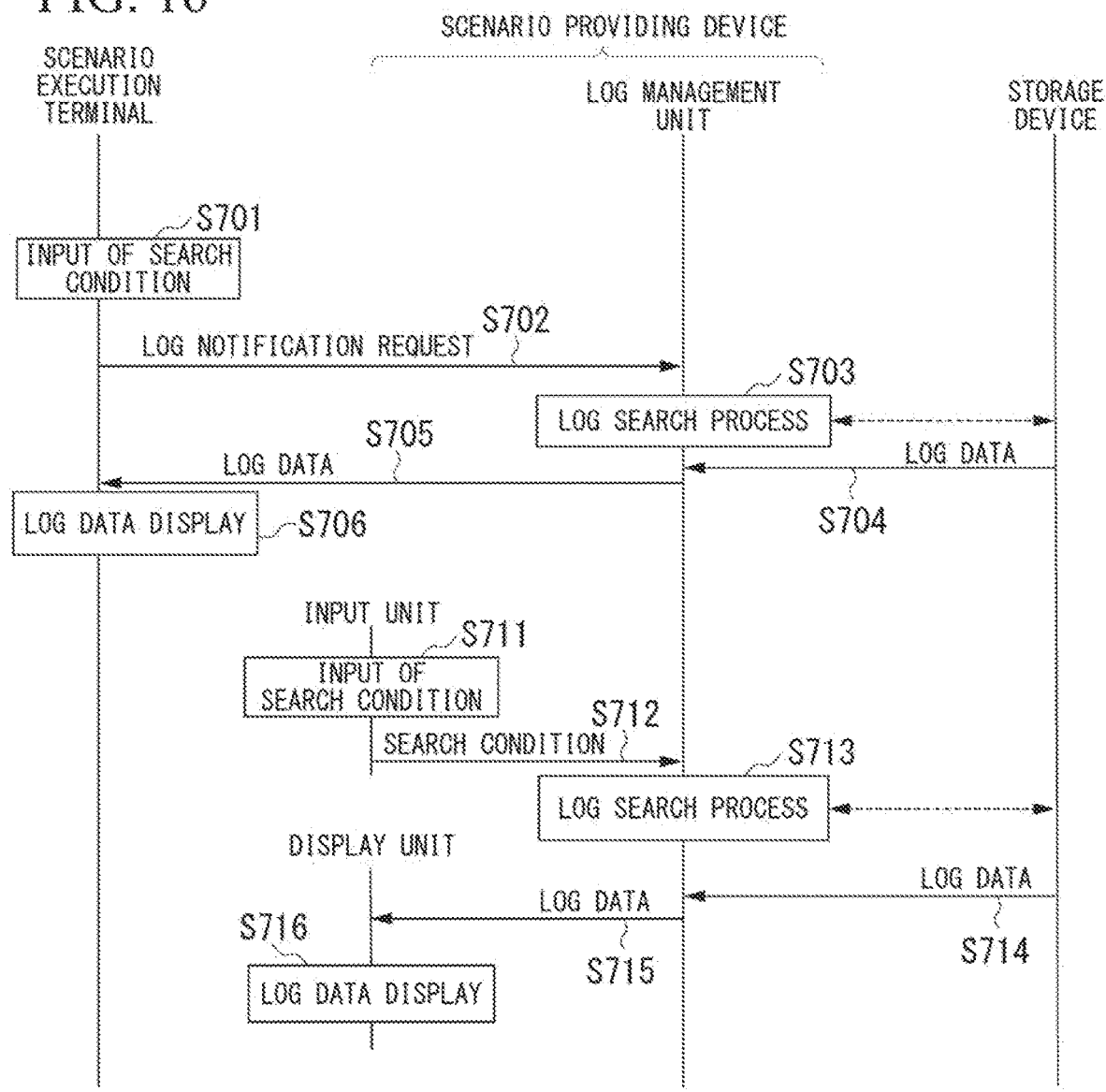
FIG. 16 is a sequence diagram illustrating a log inquiry procedure of the scenario execution system according to the first embodiment.

FIG. 16 is a sequence diagram illustrating a log inquiry procedure of the scenario execution system 1. The tenant inputs a log data search condition and a log notification request using the input unit 52 of the scenario execution terminal 5 (step S701). As the search conditions, the same search conditions as those of the log status notification request can be used. The log acquisition unit 546 transmits a log notification request having the search conditions, the searcher information, and the decryption key of the searcher indicated by the searcher information set therein to the scenario providing device 2 (step S702). The searcher information may be a tenant ID or a combination of a tenant ID and a user ID. Further, the storage location of the decryption key may be set in the log notification request instead of the decryption key.

When the log management unit 246 of the scenario providing device 2 receives the log notification request, the log management unit 246 performs a search process on the log data stored in the storage device 3 according to the search conditions set in the log notification request (step S703). The search process is the same as in step S603 of FIG. 15. The log management unit 246 reads the log data obtained through the search in step S703 from the storage device 3 (step S704). The log management unit 246 extracts the data permitted for the searcher indicated by the searcher information from the read log data. That is, the log management unit 246 extracts data that can be decrypted by using the decryption key notified of through the log notification request. The log management unit 246 generates log screen data for displaying log data composed of the extracted data, and transmits the log screen data to the scenario providing device 2 (step S705). The log acquisition unit 546 of the scenario execution terminal 5 displays the received log display screen on the display unit 53 (step S706).

The tenant manager may perform log search. In this case, the tenant manager inputs the log data search condition using the input unit 22 of the scenario providing device 2 (step S711). The log management unit 246 receives the input search conditions (step S712), and performs a process of searching for the log data stored in the storage device 3 according to the received search conditions (step S713). The search process is the same as in step S603 of FIG. 15. However, the log management unit 246 performs decryption using the decryption key of the tenant manager. The log management unit 246 reads the log data obtained through the search in step S713 from the storage device 3 (step S714). The log management unit 246 extracts the data permitted for the tenant manager from the read log data. The log management unit 246 generates log screen data for displaying the log data composed of the extracted data and displays the log screen data on the display unit 23 (step S715 and step S716).

The log notification request may also serve as the log status notification request. In this case, the log management unit 246 of the scenario providing device 2 includes a display of the log status in the log screen data.

It is also possible to use the scenario execution system 1 to notarize automated process of transactions between tenants. In this case, the scenario execution system 1 has a communication function for cooperation with other tenants, a function of transmitting and providing notarization by designating a specific tenant, a function of searching for an execution history and a notarized record of a scenario, and a function of associating a series of scenario history as a transaction with a notarized record. Hereinafter, a case in which a company A of the tenant A and a company B of the tenant B conduct a transaction will be described by way of example with reference to FIG. 17. Further, the scenario execution terminal 5 of the company A is described as a scenario execution terminal 5a, and the scenario execution terminal 5 of the company B is described as a scenario execution terminal 5b.

Figure 17:
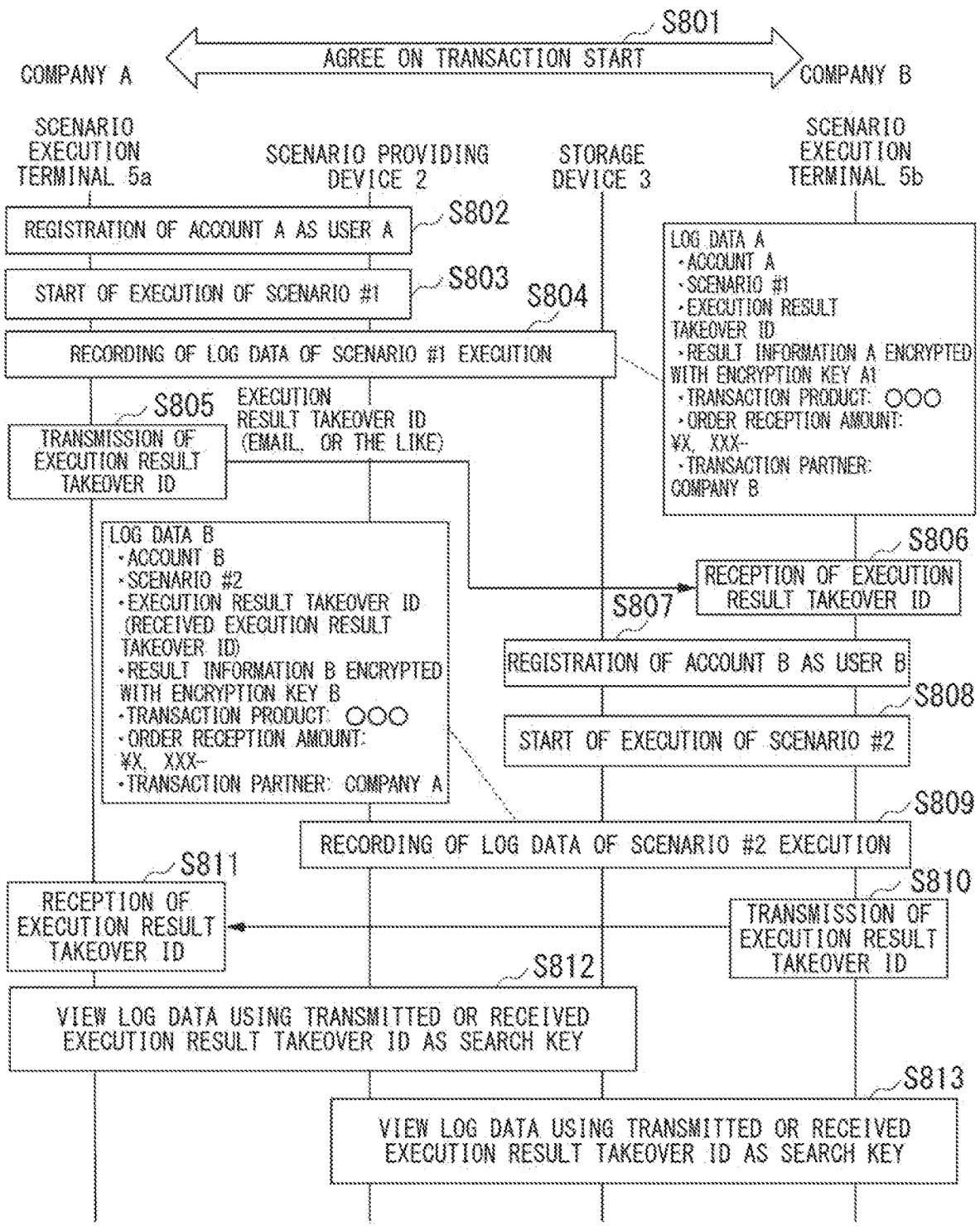
FIG. 17 is a sequence diagram illustrating a procedure when the scenario execution system according to the first embodiment notarizes an automated process of a transaction between tenants.

As illustrated in FIG. 17, first, the company A and the company B agree on a transaction (step S801). According to this agreement, the company A decides to use scenario #1 and the company B decides to use scenario #2 that cooperates with the scenario #1. The cooperation with the scenario #1 means using information generated as a result of executing the scenario #1.

The scenario execution terminal 5a of the company A and the scenario providing device 2 perform the process illustrated in FIG. 10, register an account A as a user ID of a user A in the customer management information of the company A, and implement the scenario execution application on the scenario execution terminal 5a (step S802). The scenario execution terminal 5a of the company A and the scenario providing device 2 perform the process in FIG. 11 and register the scenario execution schedule information of the scenario #1 in the scenario providing device 2. The scenario execution terminal 5a of the company A and the scenario providing device 2 perform processes of steps S401 to S404 of FIG. 13, instruct the scenario execution terminal 5a to execute the scenario #1, and activates the scenario execution unit 544 (step S803).

The scenario execution terminal 5a of the company A and the scenario providing device 2 perform processes of steps S405 to S408 of FIG. 13 and a process of FIG. 14 (step S804). That is, the scenario execution terminal 5a executes the scenario #1, and the scenario providing device 2 generates log data A based on the event generated by the scenario execution terminal 5a executing the scenario #1. When the scenario execution terminal 5a executes the scenario #1, for example, "transaction product: ∘∘∘", "order reception amount: ¥X, XXX-", "transaction partner: company B", "execution result takeover ID: R1", and the like are set in a system of the company A. The scenario execution terminal 5a transmits these pieces of information to the scenario providing device 2 as the event execution result through the event notification. The log recording unit 245 of the scenario providing device 2 sets a result information A including these pieces of information received through the event notification, in the log item group #1 of which the disclosure destination is the company A. Further, the log item group #1 may include log item information of other events generated by the execution of the scenario #1. The log recording unit 245 generates the log data A having the key information including a tenant ID of the company A, the account A, the scenario #1, and the like, and the encrypted log item group #1 set therein. The execution result takeover ID may be included in the key information. Further, the log recording unit 245 may include log item group #2 of which the disclosure destination is the company B, in the log data A. For example, the log recording unit 245 encrypts the log item group #2 having the result information A set therein using a public key of the company B and includes the log item group #2 in the log data A. The log recording unit 245 of the scenario providing device 2 records the generated log data A to the storage device 3.

The scenario execution terminal 5a notifies the scenario execution terminal 5b of the company B of the execution result takeover ID (step S805). The notification may include a slip file generated through execution of the scenario #1 or slip information in which a storage location such as a URL of the slip file has been described. Further, the execution result takeover ID may be included in the slip file. For example, the scenario execution terminal 5a transmits the execution result takeover ID and the slip information to the scenario execution terminal 5b through an e-mail or the like. The scenario execution terminal 5b receives the execution result takeover ID and the slip information from the scenario execution terminal 5a and stores the execution result takeover ID and the slip information (step S806).

On the other hand, the scenario execution terminal 5b of the company B and the scenario providing device 2 perform the process of FIG. 10, register an account B as a user ID of a user B in the customer management information of the company B, and implement the scenario execution application in the scenario execution terminal 5b (step S807). Step S807 may be performed before step S806. The scenario execution terminal 5b of the company B and the scenario providing device 2 perform the process in FIG. 11 and register the scenario execution schedule information of the scenario #2 in the scenario providing device 2. The scenario execution terminal 5b of the company B and the scenario providing device 2 perform the processes of steps S401 to S404 of FIG. 13, instruct the scenario execution terminal 5b to execute the scenario #2, and activate the scenario execution unit 544 (step S808). The scenario #2 includes an operation for referencing information included in the slip file generated through execution of the scenario #1.

The scenario execution terminal 5b of the company B and the scenario providing device 2 perform the processes of steps S405 to S408 of FIG. 13 and the process of FIG. 14 (step S809). That is, the scenario execution terminal 5b executes the scenario #2, and the scenario providing device 2 generates the log data B based on the event generated by the scenario execution terminal 5b executing the scenario #2. When the scenario execution terminal 5b executes the scenario #2, "transaction product: ∘∘∘", "ordering amount: ¥X, XXX-", "transaction partner: company A", "execution result takeover ID: R2", and the like are set in the system of the company B. The scenario execution terminal 5b transmits these pieces of information to the scenario providing device 2 as the event execution result through the event notification. The log recording unit 245 of the scenario providing device 2 sets the result information B including these pieces of information received through the event notification, in the log item group #1 of which the disclosure destination is the company B. Further, the log item group #1 may include log item information of other events generated by the execution of the scenario #2. The log recording unit 245 generates log data B having key information including a tenant ID of the company B, an account B, scenario #2, and the like, and the encrypted log item group #2 set therein. The execution result takeover ID may be included in the key information. Further, the log recording unit 245 may include the log item group #2 of which the disclosure destination is the company A, in the log data B. For example, the log recording unit 245 encrypts the log item group #2 having the result information B set therein with a public key of the company A and includes the log item group #2 in the log data. The log recording unit 245 of the scenario providing device 2 records the generated log data B on the storage device 3.

The scenario execution terminal 5*b* notifies the scenario execution terminal 5*a* of the company A of the execution result takeover ID (step S810). The notification may include a slip file generated through execution of the scenario #2, or slip information in which a storage location of the slip file has been described. Further, the execution result takeover ID may be included in the slip file. For example, the scenario execution terminal 5*b* transmits the execution result takeover ID and the slip information to the scenario execution terminal 5*a* through an e-mail or the like. The scenario execution terminal 5*a* receives the execution result takeover ID and the slip information from the scenario execution terminal 5*b* and stores the execution result takeover ID and the slip information (step S811).

The scenario execution terminal 5*a* of the company A and the scenario providing device 2 perform a process in FIG. 16 and display the log data on the scenario execution terminal 5*a* (step S812). In this case, in the process of step S701, the user A of the company A inputs the execution result takeover ID transmitted in step S805 or the execution result takeover ID received in step S811 as the search condition to the scenario execution terminal 5*a*. When the execution result takeover ID transmitted in step S805 is set as the search condition, the log data A is displayed on the scenario execution terminal 5*a*. When the execution result takeover ID transmitted in step S805 is set as the search condition, the result information B set in the log item group of which the disclosure destination is the company A among the information in the log data B is displayed on the scenario execution terminal 5*a*. When the log data B includes the execution result takeover ID in the key information and does not include the log item group of which the disclosure destination is the company A, the log management unit 246 of the scenario providing device 2 notifies the scenario execution terminal 5*a* that the log data has been detected so that this is displayed.

The scenario execution terminal 5*b* of the company B and the scenario providing device 2 perform the process in FIG. 16 and display the log data on the scenario execution terminal 5*b* (step S813). In this case, in the process of step S701, the user B of the company B inputs the execution result takeover ID transmitted in step S810 or the execution result takeover ID received in step S806 as a search condition to the scenario execution terminal 5*b*. When the execution result takeover ID transmitted in step S810 is set as the search condition, the log data B is displayed on the scenario execution terminal 5*b*. When the execution result takeover ID transmitted in step S805 is set as the search condition, the result information A set in the log item group of which the disclosure destination is the company B among the information in the log data A is displayed on the scenario execution terminal 5*b*. When the log data A includes the execution result takeover ID in the key information and does not include the log item group of which the disclosure destination is the company B, the log management unit 246 of the scenario providing device 2 notifies the scenario execution terminal 5*b* that the log data has been detected so that this is displayed.

Figure 18:
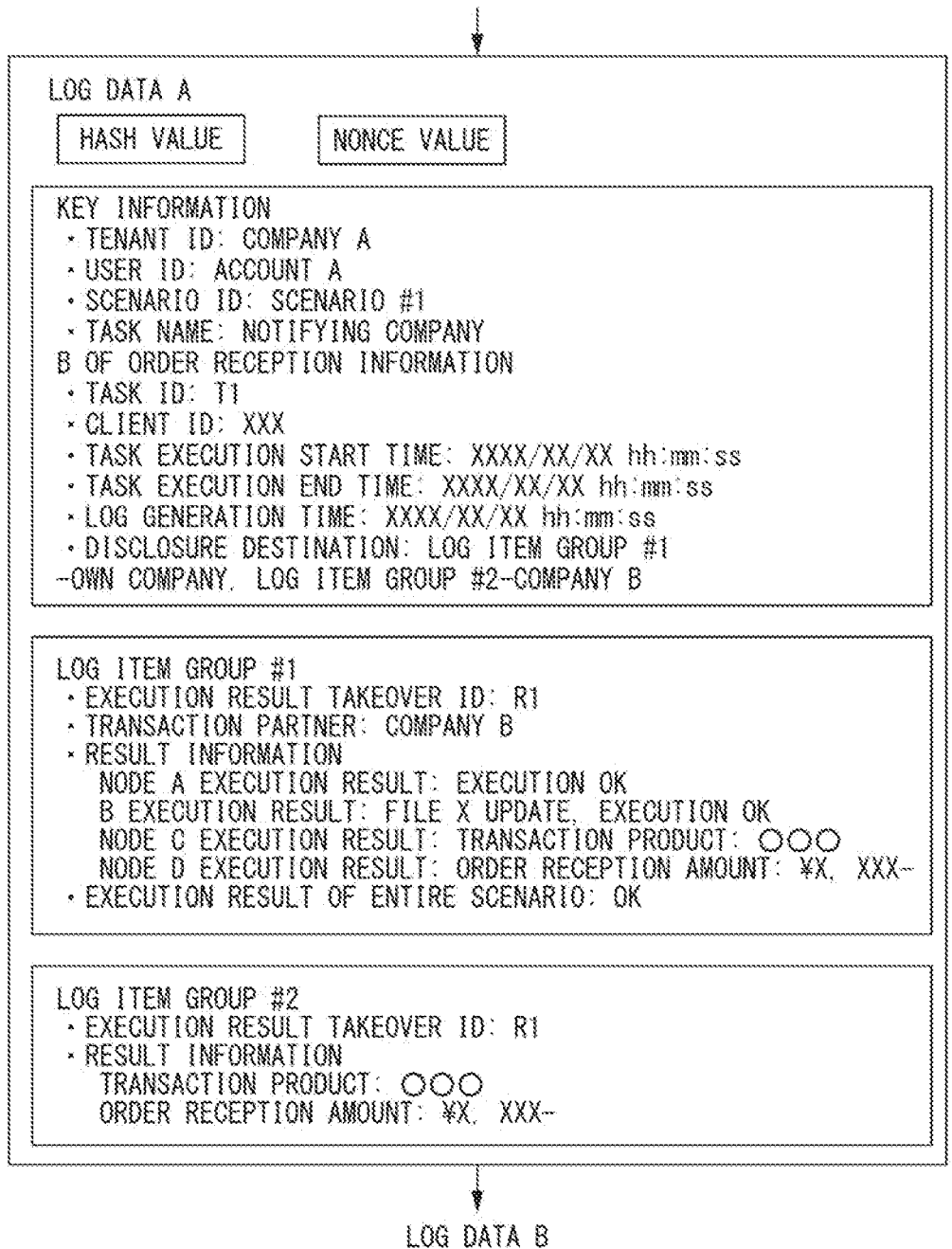
FIG. 18 is a table illustrating an example of log data according to the first embodiment.
Figure 19:
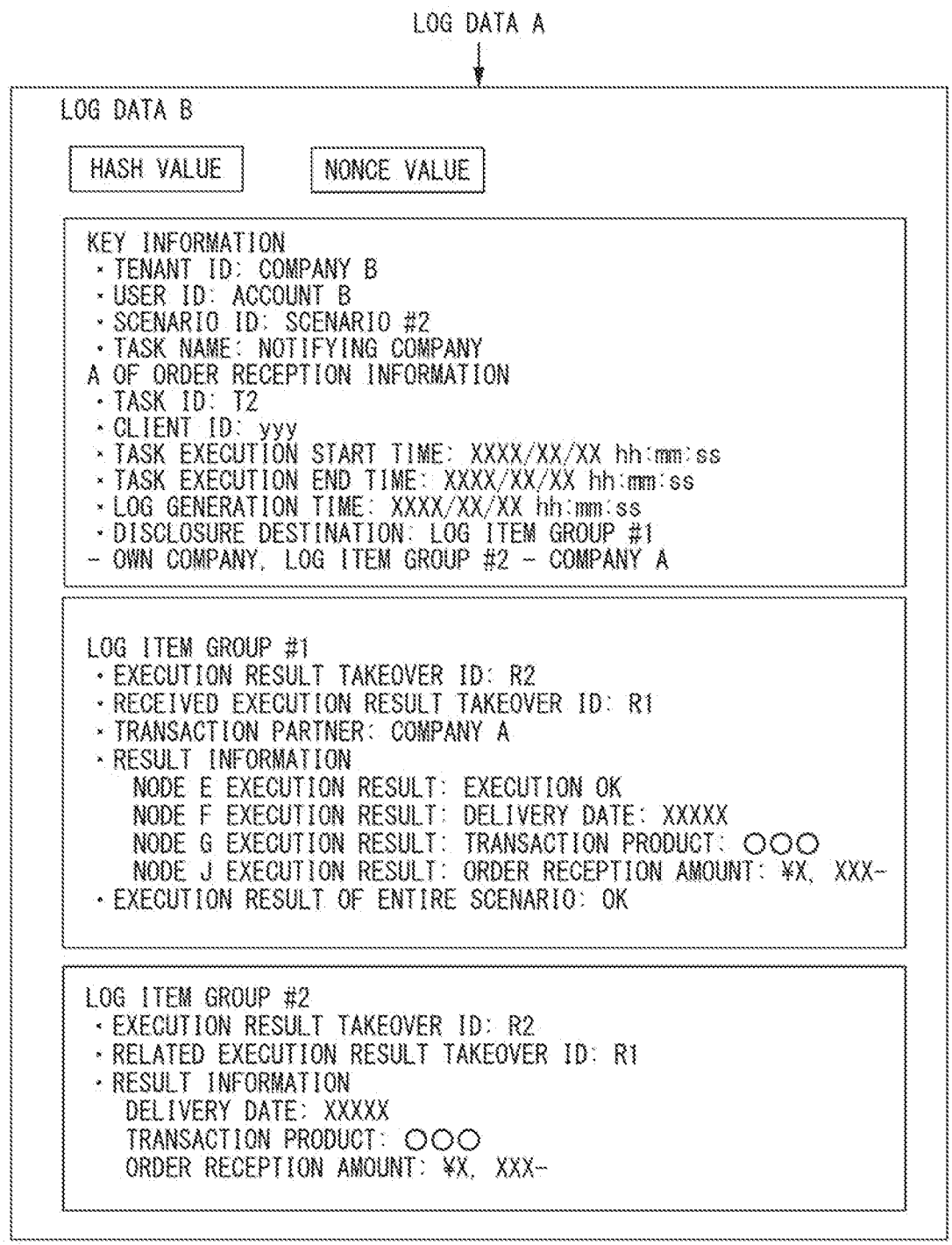
FIG. 19 is a table illustrating an example of log data according to the first embodiment.

FIGS. 18 and 19 are diagrams illustrating an example of log data generated in the process illustrated in FIG. 17. FIG. 18 illustrates an example of the log data A that is generated by the scenario execution terminal 5*a* of the tenant A executing the scenario #1. The log data A includes a hash value of the log data generated before the log data A, and a nonce value that a node computer of the storage device 3 has used to acquire an authority to record the log data. Further, the log data A includes the key information, the log item group #1, and the log item group #2. The log item group #1 is encrypted with an encryption key A1 so that the log item group #1 can be decrypted with a decryption key A1 of the company A. The log item group #2 is encrypted with a public key B1 so that the log item group #2 can be decrypted with a decryption key B1 of the company B. The execution result takeover ID that the company B has been notified of or content of the result information A is set in in the log item group #2. Information common to the log item group #1 and the log item group #2 may not be included in the log item group #1, and the log item group #2 may be encrypted so that the log item group #2 can be decrypted with any one of a decryption key of the company A or a decryption key of the company B. Further, the log data A may not include the log item group #2.

FIG. 19 illustrates an example of the log data B that is generated by the scenario execution terminal 5*b* of the tenant B executing the scenario #2. The log data B includes a hash value generated from the log data A, and a nonce value that the node computer of the storage device 3 has used to acquire the authority to record the log data. Further, the log data B includes the key information, the log item group #1, and the log item group #2. The log item group #1 is encrypted with an encryption key B2 so that the log item group #1 can be decrypted with a decryption key B2 of the company B. The log item group #2 is encrypted with a public key A2 so that the log item group #2 can be decrypted with a decryption key A2 of the company A. The execution result takeover ID passed to the company A or content of the result information B is set in the log item group #2. Information common to the log item group #1 and the log item group #2 may not be included in the log item group #1, and the log item group #2 may be encrypted so that the log item group #2 can be decrypted with any one of a decryption key of the company B or a decryption key of the company A. Further, the log data B may not include the log item group #2.

Although "between two tenants" has been described by way of example, the same procedure can be performed among three or more tenants. For example, the company A, the company B, and the company C may agree on a transaction, the company A may decide to use the scenario #1, the company B may decide to use the scenario #2 cooperating with the scenario #1, and the company C may decide to use the scenario #3 cooperating with the scenario #2. In this case, the scenario execution system 1 performs processes of steps S808 to S810 of FIG. 17 with the transaction partner as the company C instead of the company A. Further, the same process as the process between the scenario execution terminal 5*b* and the scenario providing device 2 is performed between the scenario execution terminal 5 of the company C and the scenario providing device 2.

FIG. 20 illustrates a display example of a log search screen displayed on the display unit 53 of the scenario execution terminal 5. The user selects an execution history display button B1 using the input unit 52 of the scenario execution terminal 5 and inputs a search condition to a search condition input field F1, so that a list of log data that the log management unit 246 of the scenario providing device 2 has read in step S704 is displayed on the log search screen. In the list, some information and status of each log data are displayed. The user selects a log viewing button B2 corresponding to log data to be viewed from the list of log data using the input unit 52 of the scenario execution terminal 5.

FIG. 21 illustrates a display example of the log display screen displayed on the display unit 53 of the scenario execution terminal 5. In FIG. 21, the log data corresponding to the log viewing button B2 selected in FIG. 20 is displayed. Using this display, the user can confirm content of a log. When the user selects a download button B3, the log acquisition unit 546 of the scenario execution terminal 5 transmits a log data download request to the scenario providing device 2. The log management unit 246 of the scenario providing device 2 reads the log data requested to be downloaded from the storage device 3 and transmits the log data to the scenario providing device 2.

The scenario #1 and the scenario #2 assume the following processing content, for example. As an example, according to the scenario #1, a company registers order reception and ordering information or slip information in a purchasing transaction using a CRM system, a sales support system, or the like that uses a cloud service, and according to the scenario #2, a transaction partner thereof performs a process using information registered in the cloud. For example, the company A on the selling side registers items, price, and the like as order reception information in a cloud, and the company B on the buying side registers items, price, and the like as ordering information. Another example is a scenario in which use of services for directly transmitting and receiving information, such as a contract procedure or document exchange, is cooperated. Cooperation with an electronic signature system or a customer management system is assumed.

The scenario execution system 1 uses the log data to provide the following functions as a service. That is, the scenario execution system 1 makes it possible to refer to and download log data that can be used as a notarized record at any time. Accordingly, the company A and the company B can leave a trail for a transaction therebetween at the same time as execution. Further, an authority to refer to the notarized record is imparted to a senior or auditing department of the company A and the company B, an external auditing corporation involved, or the like such that presentation of transaction history information and use of the transaction history information as an auditing record can be achieved.

According to the above-described embodiment, the scenario execution system 1 can record a log regarding use or execution of the automated process in the scenario execution terminal 5 so that the log has tamper resistance through a blockchain technology, and provide this log as the notarized record certified by a third party.

Further, in the related art, processes across organizations or departments require a cost and time to standardize and implement procedures. According to the above-described embodiment, an automated process can be incorporated into a transaction between tenants or users. Further, since the automated process and a tamper-resistant recording process are directly cooperated, it is possible to improve the immediacy of the transaction itself. Therefore, the immediacy of the transaction itself between users is improved, and even when a result of the automated process in other organizations or departments is used for an automated process of users, it is not necessary to reconfirm or confirm information to be used, the efficiency of entire business is improved.

According to the above-described embodiment, it is possible to realize a service for providing a notarized record of an automated process using an RPA technology and a blockchain technology. That is, the scenario execution system 1 records and stores an execution situation of the scenario, which is execution content of the automated process between users using a mechanism of a distribution management ledger that efficiently and permanently records a transaction between unspecified bases. Therefore, the scenario execution system 1 can provide log data as a notarized record that can be verified and has tamper resistance.

A function of the processing unit 24 of the scenario providing device 2, the storage device 3, and the processing unit 54 of the scenario execution terminal 5 in the above-described embodiment may be realized by a computer. In this case, the function may be realized by recording a program for realizing this function on a computer-readable recording medium, loading the program recorded on the recording medium into a computer system, and executing the program. Here, the "computer system" includes an OS or hardware such as a peripheral device. Further, the "computer-readable recording medium" refers to a portable medium such as a flexible disk, a magneto-optical disc, a ROM, or a CD-ROM, or a storage device such as a hard disk built into in the computer system. Further, the "computer-readable recording medium" may also include a recording medium that dynamically holds a program for a short period of time, such as a communication line in a case in which the program is transmitted over a network such as the Internet or a communication line such as a telephone line or a recording medium that holds a program for a certain period of time, such as a volatile memory inside a computer system including a server and a client in such a case. Further, the program may be a program for realizing some of the above-described functions or may be a program capable of realizing the above-described functions in a combination with a program previously stored in the computer system.

Further, some functions of the scenario providing device 2 may be realized by an external device connected to the scenario providing device 2. For example, functions of the log recording unit 245 and the log management unit 246 may be included in a log recording device connected to the scenario providing device 2.

According to the embodiment described above, the scenario execution system includes a scenario execution terminal, a log management device, and a storage device. The scenario execution terminal includes a scenario execution unit and an event notification unit. The scenario execution unit executes a scenario file having the scenario indicating the procedure of the operations in the scenario execution terminal described therein. The event notification unit notifies the log management device of the information on the event that occurred when the scenario execution unit executes the scenario file. The log management device is, for example, the scenario providing device 2 of the embodiment. The log management device includes the log recording unit. The log management device receives the information on the event from the scenario execution terminal, and records the log data having the received information on the event set therein on the storage device. The storage device adds, to the log data, information uniquely generated on the basis of log data recorded before such log data and stores resultant log data. For example, the storage device records the log data through the blockchain.

The log management device may further include the scenario providing unit that transmits the scenario file to the scenario execution terminal.

The scenario execution system may include a plurality of the scenario execution terminals including a first scenario execution terminal and a second scenario execution terminal. The log recording unit records first log data on the storage device, the first log data being log data having the information on the event generated by the first scenario file being executed in the first scenario execution terminal, and takeover identification information assigned to the execution of the first scenario file set therein. The log management device further includes a log management unit that receives the takeover identification information from the second scenario execution terminal that executes the second scenario file having the procedure including operations for using the information generated by execution of the first scenario file described therein, and returns information on the first log data having the received takeover identification information set therein. The information on the event recorded in the first log data may include information generated by the execution of the first scenario file and used in the execution of the second scenario file.

Further, the log recording unit may record second log data on the storage device, the second log data being log data having the information on the event generated by the second scenario file being executed in the second scenario execution terminal, and takeover identification information assigned to the execution of the second scenario file set therein. The log management unit receives the takeover identification information from the first scenario execution terminal, and returns information on the second log data having the received takeover identification information set therein.

Further, the scenario execution system may include a scenario providing unit that transmits, to the respective different scenario execution terminals, the first scenario file, and the second scenario file having a procedure including operations for using the information generated by execution of the first scenario file described therein.

Further, the scenario execution system may include a plurality of scenario execution terminals including the first scenario execution terminal that executes the first scenario file, and the second scenario execution terminal that executes the second scenario file having a procedure including operations for using the information generated by execution of the first scenario file described therein. The log recording unit writes information generated by the first scenario file being executed in the first scenario execution terminal and used in execution of the second scenario file to the storage device. The log management device may include a scenario providing unit that transmits the first scenario file to the first scenario execution terminal and the second scenario file to the second scenario execution terminal.

Although the embodiment of the present invention has been described in detail with reference to the drawings, a specific configuration is not limited to this embodiment, and includes designs and the like within a range that does not depart from the gist of the present invention.

What is claimed is:

1. A log recording method in a scenario execution system including first scenario execution terminal, a second scenario execution terminal, a log management device, and a storage device, the log recording method comprising:
executing, by the first scenario execution terminal, a first scenario file having a scenario indicating a procedure of operations in the first scenario execution terminal described therein;
notifying, by the first scenario execution terminal, the log management device of information on an event generated by the first scenario file being executed in the step of executing;
receiving, by the log management device, information on the event notified of in the step of notifying, and recording first log data having the received information on the event set therein on the storage device;
adding, by the storage device, to the first log data, information uniquely generated on the basis of log data recorded before the first log data and storing resultant log data;
recording first log data on the storage device, the first log data being log data having the information on the event generated by the first scenario file being executed in the first scenario execution terminal, and first takeover identification information assigned to the execution of the first scenario file set therein and representing results of the execution of the first scenario file to be taken over to the second scenario execution terminal, and
receiving second takeover identification information from the second scenario execution terminal executing a second scenario file having a procedure including operations for using the information generated by the execution of the first scenario file described therein, and returning information regarding the first log data having the received second takeover identification information set therein.

2. The log recording method according to claim 1, wherein the storage device records the first log data through a blockchain.

3. The log recording method according to claim 1, wherein the log management device transmits the first scenario file to the first scenario execution terminal.

4. The log recording method according to claim 1, wherein the information on the event recorded in the first log data includes information generated by the execution of the first scenario file and used in the execution of the second scenario file.

5. The log recording method according to claim 1, further comprising:
recording second log data on the storage device, the second log data being log data having the information on the event generated by the second scenario file being executed in the second scenario execution terminal, and second takeover identification information assigned to the execution of the second scenario file set therein and representing result of the execution of the second scenario file to be taken over to the first scenario execution terminal, and
receiving the first takeover identification information from the first scenario execution terminal, and returning information on the second log data having the received first takeover identification information set therein.

6. The log recording method according to claim 1, wherein the scenario execution system includes a second scenario execution terminals, the log recording method further comprising transmitting, to the first scenario execution terminal and the second scenario execution terminal, a first scenario file, and a second scenario file having a procedure including operations for using the information generated by execution of the first scenario file described therein, respectively.

7. A log management device comprising a memory having computer instructions stored thereon, and a processor connected to the memory, wherein the computer program instructions, when executed by the processor, perform processing of:

receiving information on an event generated by a first scenario execution terminal executing a first scenario file having a scenario indicating a procedure of operations in the first scenario execution terminal described therein; and recording first log data having the received information on the event set therein in a storage device, where the first log data being log data having the information on the event generated by the first scenario file being executed in the first scenario execution terminal, and first takeover identification information assigned to the execution of the first scenario file set therein and representing results of the execution of the first scenario file to be taken over to a second scenario execution terminal, adding, to the first log data, information uniquely generated on the basis of log data recorded before the first log data and storing resultant log data; and receiving second takeover identification information from the second scenario execution terminal executing a second scenario file having a procedure including operations for using the information generated by the execution of the first scenario file described therein, and returning information regarding the first log data having the received second takeover identification information set therein.

* * * * *